(12) United States Patent
Takeda et al.

(10) Patent No.: US 7,873,448 B2
(45) Date of Patent: Jan. 18, 2011

(54) ROBOT NAVIGATION SYSTEM AVOIDING OBSTACLES AND SETTING AREAS AS MOVABLE ACCORDING TO CIRCULAR DISTANCE FROM POINTS ON SURFACE OF OBSTACLES

(75) Inventors: Masanori Takeda, Saitama (JP); Taro Yokoyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1107 days.

(21) Appl. No.: 10/538,523

(22) PCT Filed: Dec. 3, 2003

(86) PCT No.: PCT/JP03/15484

§ 371 (c)(1),
(2), (4) Date: Dec. 13, 2005

(87) PCT Pub. No.: WO2004/052597

PCT Pub. Date: Jun. 24, 2004

(65) Prior Publication Data

US 2006/0173577 A1 Aug. 3, 2006

(30) Foreign Application Priority Data

Dec. 10, 2002 (JP) .............................. 2002-357488

(51) Int. Cl.
*G05D 1/00* (2006.01)
(52) U.S. Cl. .............................. 701/26; 701/28; 700/253
(58) Field of Classification Search ................. 700/245, 700/258, 259; 382/153; 701/23, 25, 28, 701/211, 301, 302

See application file for complete search history.

(56) References Cited

U.S. PATENT DOCUMENTS 3,005,194 A * 10/1961 Goodell et al. ................. 342/29

(Continued)

FOREIGN PATENT DOCUMENTS

EP 1 092 458 A1 4/2001

(Continued)

OTHER PUBLICATIONS

Mäkelä, H., Von Numers, T. "Development of a navigation and control system for an autonomous outdoor vehicle in a steel plant," May 2001, Control Engineering Practice, vol. 9, Issue 5, pp. 573-583.*

(Continued)

*Primary Examiner*—Thomas G Black
*Assistant Examiner*—Sze-Hon Kong
(74) *Attorney, Agent, or Firm*—Fenwick & West LLP

(57) ABSTRACT

The content of the voice designation of a designator is recognized by a voice recognition part 130 at the time of controlling a robot, and the content of the indication of gesture or the like is recognized by an image recognition part 120. A movement destination and a map around the specific position designated are referred from a map data base 150 registering the position of an obstacle and the current position estimated by a self-position estimation part 140. After movement ease is decided by a movement ease decision part 112, the behavior is decided. When movement designation is given to the robot, correspondence according to a situation can be performed.

14 Claims, 10 Drawing Sheets

U.S. PATENT DOCUMENTS

| | | | |
|---|---|---|---|
| 3,052,882 A * | 9/1962 | Pidhayny et al. | 342/29 |
| 5,400,244 A | 3/1995 | Watanabe et al. | |
| 5,570,285 A * | 10/1996 | Asaka et al. | 701/23 |
| 5,826,216 A * | 10/1998 | Lyons et al. | 702/143 |
| 6,044,321 A * | 3/2000 | Nakamura et al. | 701/96 |
| 6,289,332 B2 * | 9/2001 | Menig et al. | 180/167 |
| 6,819,283 B2 * | 11/2004 | Okai et al. | 342/70 |
| 2002/0013641 A1 * | 1/2002 | Nourbakhsh et al. | 700/245 |
| 2002/0103576 A1 | 8/2002 | Takamura et al. | |
| 2002/0120361 A1 | 8/2002 | Kuroki et al. | |
| 2002/0165638 A1 * | 11/2002 | Bancroft et al. | 700/213 |
| 2003/0060930 A1 | 3/2003 | Fujita et al. | |
| 2004/0024527 A1 * | 2/2004 | Patera | 701/301 |

FOREIGN PATENT DOCUMENTS

| | | |
|---|---|---|
| EP | 1 386 699 A2 | 2/2004 |
| JP | 05-011843 | 1/1993 |
| JP | 06-063883 | 3/1994 |
| JP | 10-217161 | 8/1998 |
| JP | 11-175132 A | 7/1999 |
| JP | 2001-188551 | 7/2001 |
| JP | 2001-287180 A | 10/2001 |
| JP | 2002-216129 | 8/2002 |
| JP | 2003-039365 | 2/2003 |
| JP | 2004-078316 | 3/2004 |
| JP | 2004-094288 | 3/2004 |
| WO | WO 02/065825 A | 8/2002 |

OTHER PUBLICATIONS

Miura, J. Shirai, Y. "Modeling obstacles and free spaces for a mobile robot using stereovision with uncertainty," May 1994, IEEE International Conference on Robotics and Automation, 1994. Proceedings., vol. 4, pp. 3368-3373.*

Tunstel, E. "Fuzzy spatial map representation for mobile robot navigation," Feb. 1995, Symposium on Applied Computing, Proceedings of the 1995 ACM symposium on Applied computing, pp. 586-589.*

Perzanowski, D., Schultz, A.C., Adams, W., Marsh, E., Bugajska, M. "Building a multimodal human-robot interface," Jan.-Feb. 2001, IEEE Intelligent Systems, vol. 16, Issue 1, pp. 16-21.*

Bischoff, R., Graefe, V. "Integrating vision, touch and natural language in the control of asituation-oriented behavior-based humanoid robot," Oct. 1999, IEEE International Conference on Systems, Man, and Cybernetics, 1999. IEEE SMC '99 Conference Proceedings, vol. 2, pp. 999-1004.*

International Search Report, PCT/JP03/15484, Mar. 23, 2004, 3 pages.

Supplementary European Search Report, EPO Application No. EP 03 77 7207, Nov. 6, 2009, 3 pages.

* cited by examiner

ROBOT NAVIGATION SYSTEM AVOIDING OBSTACLES AND SETTING AREAS AS MOVABLE ACCORDING TO CIRCULAR DISTANCE FROM POINTS ON SURFACE OF OBSTACLES

TECHNICAL FIELD

The present invention relates to a robot control device, a robot control method and a robot control program. More particularly, the present invention relates to the robot control device, the robot control method and the robot control program for performing a suitable movement and response according to the designation content from a designator and a situation in a movement space.

BACKGROUND ART

Although autonomously moving robot acting according to various purposes has been conventionally known, it is generally planned that the conventional robot moves as designated according to the designation due to a person (designator).

However, even if the robot does move as designated, the movement of the robot is often difficult in fact. For example, since the designator is a person, what is thought to be designated may not correspond to the content actually uttered and designated by error. In such a case, when an obstacle or the like is located at the location designated, the movement of the robot is obstructed by the obstacle.

Even if the designator utters what the designator thinks, there may be a level difference beyond the capability in which the robot can move. In this case, similarly, the robot is disturbed by the level difference and cannot move. When a person usually designates, the person does not always specify a material minutely, and may designate using a reference term such as "that" and "this". In this case, the robot which cannot precisely recognize the designation becomes the cause of malfunction. Even when the robot recognizes the designation, the movement of the robot may fail by the error of the designation due to the designator and the unsuitable designation, and the robot may not be able to move suitably by collision or the like with an obstruction. When the robot cannot move correctly if there are no frequent and fine movement designations such as "move x meters to the left, and y meters to the front" from the designator, the load of the designator is large and the robot is unsuitable for bilateral work of the person and the robot.

Examples of techniques relevant to the movement of a robot include the following.

For example, an orbital forming method for realizing evasive behavior at the time of movement with a short time and an easy algorithm is disclosed in Japanese Published Unexamined Patent Application H5-11843. According to the orbital forming method, when the schedule orbit of the robot intersects with an obstacle range expressed by a line segment, the robot avoids the orbit, recalculates an orbit for avoiding the obstacle by the shortest distance, and moves while avoiding the obstacle.

However, when the method recalculates the orbit for avoiding the obstacle, the method calculates so that the robot passes along the side of the obstacle, and the method does not take a margin according to operation or the like of the robot into consideration. Therefore, when the robot moves on the scheduled orbital, the robot may interfere with an obstacle depending on the operation of the robot.

A robot control device for preventing the robot from moving out of an area where the robot should move is disclosed in Japanese Published Unexamined Patent Application H6-63883. In particular, the robot control device reads a data depot previously buried under the boundary part of the movement area, and thereby the movement of the robot to the outside of a movement allowable area is prevented. However, in the robot control device, it is necessary to previously bury the data depot under the boundary part of the movement area, and the robot may move to an area where the robot should not move at a location under which a data depot is not buried.

An information processor of a robot responding according to the reference term due to the designator is disclosed in Japanese Published Unexamined Patent Application 2001-188551.

However, the information processor of the robot only selects a suitable reference term, and does not decide whether the robot can arrive at the location shown by the reference term. Therefore, when the robot moves to the location designated, the robot may collide with an obstacle.

The present invention has been accomplished in view of the above problems.

DISCLOSURE OF THE INVENTION

It is an object of the present invention to provide a robot control device for controlling a robot having a microphone, an imaging device and a self-position detection device as one illustrated aspect of the present invention. This robot control device includes: a voice recognition part for recognizing the designation content of a designator based on sounds collected by the microphone; an image recognition part for recognizing the designation content of the designator based on an image imaged by the imaging device; a self-position estimation part for estimating the current position of the robot based on an output from the self-position detection device; a map data base for retaining map data registering at least the position of an obstacle; a decision part for deciding whether the movement to a specific position is required based on the recognition result of the voice recognition part and image recognition part; a movement ease decision part for deciding movement ease to the specific position based on the current position estimated by the self-position estimation part and the map data when the decision part decides that the movement to the specific position is required; a behavior decision part for deciding the behavior according to the movement ease decided by the movement ease decision part; and a behavior control part for executing the behavior according to the decision of the behavior decision part.

According to the robot control device having such a composition, when the designation necessary for the movement to the specific position is given to the robot, the decision part decides the necessity for movement, and the movement ease decision part decides the movement ease to the specific position based on the current position estimated by the self-position estimation part and map data. The behavior decision part decides the behavior according to the movement ease. Therefore, when the movement ease is low (difficult), the robot can be safely moved by inquiry of the designator, stopping the movement and approaching and stopping to the specific position. The designation which should be moved means the case where the designation for moving to the specific position like "Please go to Mr. A" is performed. In addition, the designation which should be moved includes a designation which is not the movement designation itself like "Please take data from a desk", but designation which should be moved. The current position of the robot estimated by the self-position estimation part may be referred if needed when judging whether the movement to the specific position is required.

In the robot control device, the movement ease decision part may read the position of the obstacle surrounding the movement route to the specific position from the map data base, and set at least two or more areas based on the distance from the obstacle, and the behavior decision part may decide the behavior according to an area containing the specific position and an area where the robot exists.

Thus, the robot can judge the movement ease by dividing into at least two or more areas based on the distance of the obstacle, and suitably correspond according to the movement ease by deciding the behavior according to the area including the specific position and the area where the robot exists.

The movement ease decision part may include: an obstacle recognition part for recognizing the obstacle surrounding the movement route to the specific position from the current position of the robot estimated by the self-position estimation part and the map data; a warning area set part for setting an area having a possibility to interfere with an obstacle as a warning area when the robot exists, based on the position of the obstacle recognized by the obstacle recognition part; a margin area set part for setting an area with a predetermined distance from the warning area as a margin area; and a safety area set part for setting an area distant from the margin area from the obstacle as a safety area. In this case, the movement ease to the specific position is decided based on the area including the specific position and the area where the robot exists, respectively applicable to either one of the warning area, the margin area and the safety area.

Thus, the correspondence is taken according to the situation of the specific position for the movement designation due to the designator by dividing the movement ease into three steps of the warning area, the margin area and the safety area according to the distance from the obstacle.

For example, when the movement ease decision part decides that it is difficult to move to the specific position, the behavior decision part decides that the behavior decision part makes the designator confirm the designation. When the movement ease decision part decides that the movement to the specific position is easy, the behavior decision part decides that the robot moves to the specific position, and thereby safe and smooth correspondence can be attained. That is, when the movement ease decision part judges that the movement to the specific position is difficult, the designation of the designator is mistaken in many cases, and thereby the designation is confirmed by the designator. On the other hand, the movement ease decision part judges that movement to the specific position is easy, it is considered that the robot has no possibility that the robot interferes with something even if the robot moves, and the designation of the designator is also not mistaken. Thus, the communication with the designator can be suitably performed, and the smooth move operation can be performed.

The warning area set part may decide the position of a circle where a distance between representative points of the surface of the obstacle is set as a diameter, and set the warning area using the position of the circle.

Since a generally artificial material has a right-angled corner, the movement ease can be more appropriately judged by setting the warning area from the position of the circle where the distance between representative points of the surface of the obstacle is set as a diameter.

The behavior decision part decides at least any one behavior of movement, the response of movement refusal, the reconfirmation of designation, stop, deceleration and acceleration according to an area including the specific position and an area where the robot exists.

According to such a robot control device, a suitable behavior is selected from movement, the response of movement refusal, the reconfirmation of the designation, stop, deceleration and acceleration. Two behaviors such as the slowdown while moving may be selected.

The voice recognition part may have a designating range specification part for narrowing a designating area using a reference term, and the behavior decision part may recognize a specific position from the area of the logical product of the designating area narrowed by the designating range specification part and designating area recognized by the image recognition part.

According to such a robot control device, even when the designator performs a movement designation by reference terms such as "there", "this", "that" and "that way", the specific position can be easily and correctly recognized by narrowing the designating area shown by the reference term. In this case, a more exact position can be recognized by recognizing the specific position from the area of the logical product of the designating area narrowed by the reference term and the designating area recognized in the image recognition part. When designation due to voice and designation due to gesture have inconsistency, the area remaining as a result of the logical product is lost, and thereby the designator can notice the inconsistency.

The robot control device further comprises a behavior schedule transmission part for making the behavior control part output behavior schedule.

Thus, the behavior schedule transmission part makes the robot output a future behavior schedule using the screen and voice or the like, and thereby the behavior schedule transmission part can inform the behavior schedule to a surrounding person such as the designator. As a result, the behavior schedule transmission part can confirm whether the designation is transmitted to the robot correctly, a surrounding person can predict the motion of the robot.

A robot control method is provided as the other illustrated aspect of the present invention.

A robot control method of the present invention for controlling a robot having a microphone, an imaging device and a self-position detection device, includes: a designation content discriminating step of recognizing the designation content of a designator based on sounds collected by the microphone, recognizing the designation content of the designator based on an image imaged by the imaging device, estimating the current position of the robot based on an output from the self-position detection device, and deciding whether the designation of the movement to a specific position is required from the designation content recognized by the sounds and the designation content recognized from the image; a movement ease deciding step of deciding the movement ease to the specific position based on the current position estimated based on the output from the self-position detection device when the designation content discriminating step decides that the movement to the specific position is required; a behavior deciding step of deciding the behavior according to the movement ease decided by the movement ease deciding step; and a behavior controlling step of executing the behavior according to the decision of the behavior deciding step.

According to such a robot control method, the specific position designated as a movement destination is recognized by taking both the movement designation designated by the designator using the voice and the movement designation designated taking gesture or the like into consideration, and the movement ease to the specific position is further judged by the relation with the obstacle on the map data. Since the behavior of the robot is decided by the area where the specific position exists, it is possible to correspond suitably according to the situation to the movement designation of the designator. The current position of the robot estimated may be referred if needed when judging whether the movement to the specific position in the designation content discriminating step is required.

In the robot control method, the movement ease deciding step may read the position of the obstacle surrounding the movement route to the specific position from the map data base, and set the areas of a predetermined number based on the distance from the obstacle, and the behavior deciding step may decide the behavior according to an area including the specific position and an area where the robot exists.

Thus, the robot can judge the movement ease by dividing into at least areas of a predetermined number based on the distance of the obstacle, and suitably correspond according to the movement ease by deciding the behavior according to the area including the specific position and the area where the robot exists.

In the robot control method, it is preferable that the movement ease deciding step includes: an obstacle recognizing step of recognizing the obstacle surrounding the movement route to the specific position from the current position of the robot estimated based on the self-position detection device and the map data; a warning area setting step of setting an area having a possibility to interfere with an obstacle when the robot exists based on the position of the obstacle recognized by the obstacle recognizing step as a warning area; a margin area setting step of setting an area with a predetermined distance from the warning area as a margin area; a safety area setting step of setting an area distant from the margin area from the obstacle as a safety area; and a step of deciding the movement ease to the specific position based on the area including the specific position and the area where the robot exists, respectively applicable to either one of the warning area, the margin area and the safety area.

Thus, the correspondence can be taken according to the situation of the specific position for the movement designation due to the designator by dividing the movement ease into three steps of the warning area, the margin area and the safety area according to the distance from the obstacle.

It is preferable that the warning area setting step decides the position of a circle where a distance between representative points of the surface of the obstacle is set as a diameter, and sets the warning area using the position of the circle.

Since a generally artificial material has a right-angled corner, the movement ease can be more appropriately decided by setting the warning area from the position of the circle where the distance between representative points of the surface of the obstacle is set as a diameter.

It is preferable that the behavior deciding step decides at least any one behavior of movement, the response of movement refusal, the reconfirmation of designation, stop, deceleration and acceleration.

According to such a robot control method, a suitable behavior is selected from movement, the response of movement refusal, the reconfirmation of the designation, stop, deceleration and acceleration. Two behaviors such as the slowdown while moving may be selected.

It is preferable that the designating content recognizing step includes a designating range specifying step of narrowing a designating area using a reference term contained in the voice, and an image recognizing step of narrowing the designating area from the image, and the behavior deciding step recognizes the specific position from the area of the logical product of the designating area narrowed by the designating range specifying step and designating area recognized by the image recognizing step.

According to such a robot control method, even when the designator performs movement designation by reference terms such as "there", "this", "that way", the specific position can be easily and correctly recognized by narrowing the area shown by the reference term. In this case, a more exact position can be recognized by recognizing the specific position from the area of the logical product of the designating area narrowed by the reference term and designating area recognized by the image recognition step. When the designation due to voice and the designation due to gesture have inconsistency, the area remaining as a result of the logical product is lost, and thereby the designator can notice the inconsistency.

Further, the robot control method can further comprise a behavior schedule transferring step for outputting the behavior schedule decided by the behavior deciding step. Thus, the behavior schedule transmission step makes the behavior schedule decided by the behavior deciding step output using the image and voice, and thereby the behavior schedule transmission part can inform the behavior schedule to a surrounding person such as the designator. As a result, the behavior schedule transmission step can confirm whether the designation is transmitted to the robot correctly, the surrounding person can predict the motion of the robot.

A program for controlling the robot is provided as another illustrated aspect of the present invention.

That is, a robot control program for making a computer mounted on a robot function as a voice recognition means for recognizing the designation content of a designator based on sounds collected by a microphone, an image recognition means for recognizing the designation content of the designator based on the image imaged by an imaging device, a self-position estimation means for estimating the current position of the robot based on the output from the self-position detection device, a decision means for deciding whether the movement to a specific position is required based on the recognition result of the voice recognition means and image recognition means, a movement ease decision means for deciding the movement ease to the specific position based on the current position estimated by the self-position estimation means and the map data when the decision means decides that the movement to the specific position is required, and a behavior decision means for deciding the behavior according to the movement ease decided by the movement ease decision means so as to control the robot having a microphone, the imaging device and the self-position detection device.

The robot control program can be configured so as to make each functional part as referred when describing the constitution of the robot control device function to the computer. Or the robot control program may use the step of the robot control method as a component part, and perform the computer mounted on the robot.

Such a robot control program is introduced into a computer for control that the robot has, and thereby the same operation as the robot control device can be realized. Thus, by configuring as the computer program, these computer programs are introduced into the robot driven by the other control method, and thereby the robot having an excellent effect in the present invention can be easily configured. The robot control program configured as such a computer program can be stored in a computer readable media (for example, a magnetic recording medium and an optical recording medium or the like), can be easily circulated via a communication (transmission) medium, and can be easily upgraded.

BRIEF DESCRIPTION OF THE DRAWINGS

FIG. 7A and FIG. 7B show methods of recognizing the position of an obstacle.

FIG. 7C shows a setting method of a warning area, and FIG. 7D shows a setting method of a margin area and safety area.

BEST MODE FOR CARRYING OUT THE INVENTION

Hereinafter, the embodiment of the present invention will be arbitrarily explained in detail with reference to the drawings.

Figure 1:
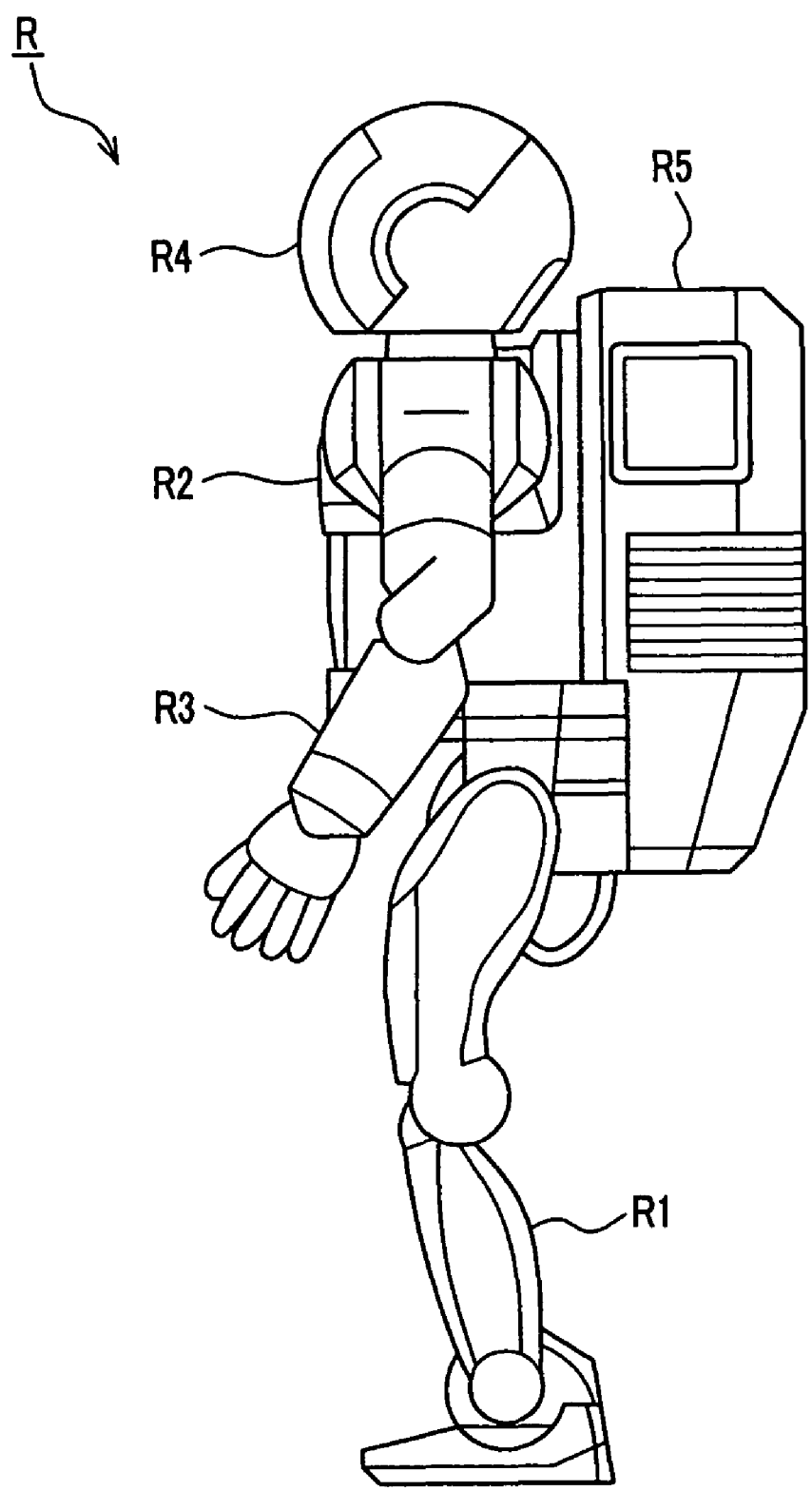
FIG. 1 is an outline view of a human type robot to which a robot control device according to the embodiment is applied.

FIG. 1 is an outline view of a human type robot R to which a robot control device according to the embodiment is applied. As shown in FIG. 1, the robot R stands and walks using two legs R1 (only one leg is shown) in the same manner as a human. The robot R has an body R2, arms R3 and a head R4, and is an autonomously walking robot. The robot R is provided with a controlling device mounting part R5 for controlling the operation of the legs R1, the body R2, the arms R3 and the head R4 so that the controlling device mounting part R5 is abutted against the back. The head R4 is provided with a CCD camera 43, a microphone 44 and a speaker 45 or the like to be described later (see FIG. 3).

Figure 2:
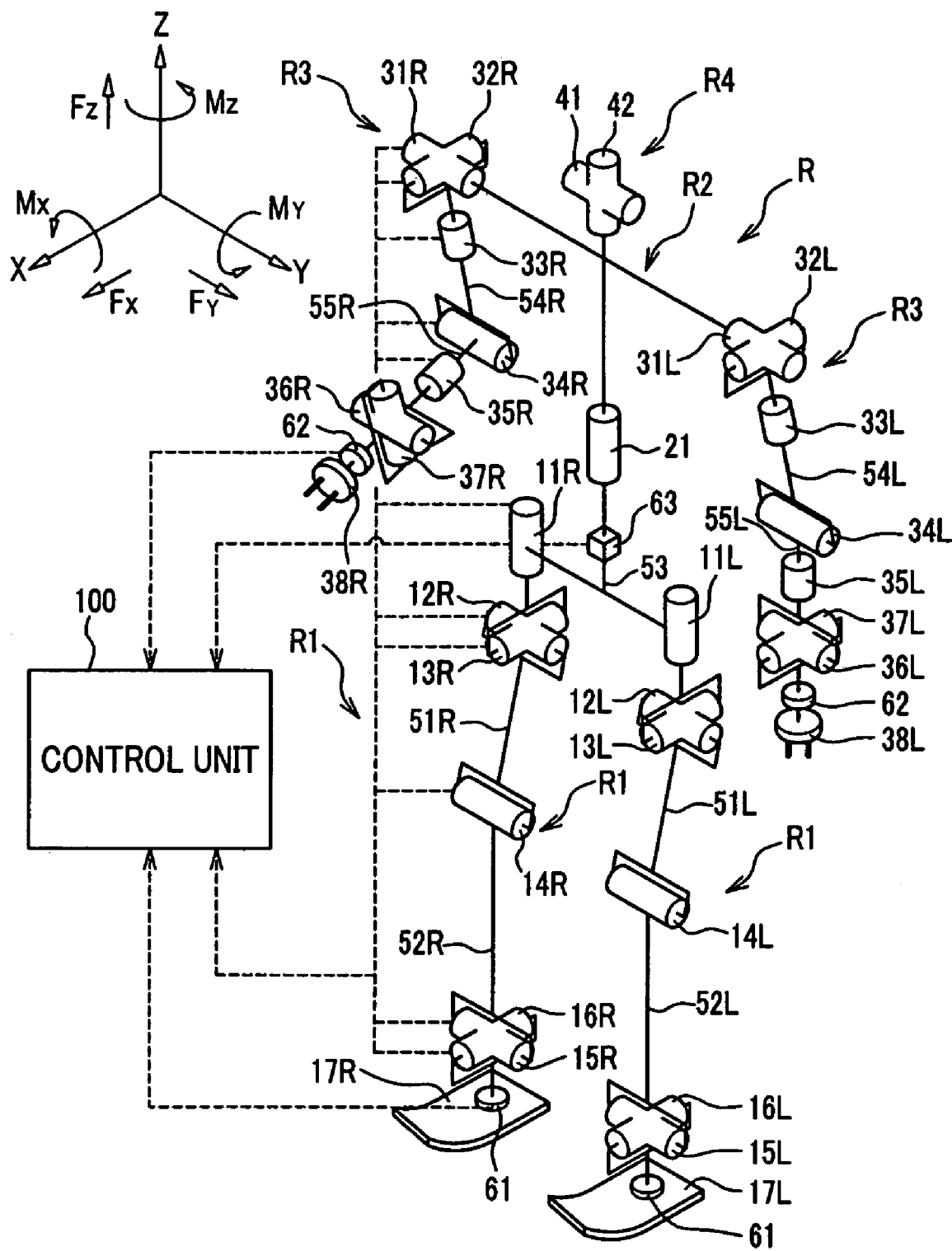
FIG. 2 is a perspective view showing an internal structure for operating the robot.

FIG. 2 is a perspective view showing a main internal structure for operating the robot R.

In FIG. 2, all the joints are shown by electric motors driving the joints for convenience of explanation.

As shown in FIG. 2, the robot R is provided with the right and left legs R1 having six joints 11R(L) to 16R(L). The right and left twelve joints are composed by hip joints 11R and 11L (the right side is set to R and the left side is set to L, and so on) for rotating the legs (around the Z-axis) provided at a hip part, hip joints 12R and 12L around a pitch axis (Y-axis) of the hip part, hip joints 13R and 13L around a roll axis (X-axis) of the hip part, knee joints 14R and 14L around a pitch axis (Y-axis) of a knee part, ankle joints 15R and 15L around a pitch axis (Y-axis) of an ankle, and ankle joints 16R and 16L around a roll axis (X-axis) of the ankle. Foot parts 17R and 17L are attached to the lower part of the legs R1.

That is, the legs R1 are provided with the hip joints 11R(L), 12R(L) and 13R(L), the knee joint 14R(L), and the ankle joints 15R(L) and 16R(L). The hip joints 11R(L) to 13R(L) and the knee joint 14R(L) are connected by thigh links 51R and 51L, and the knee joint 14R(L) and the ankle joint 15R(L), 16R(L) are connected by the lower thigh links 52R and 52L.

The legs R1 are connected to the body R2 via the hip joints 11R(L) to 13R(L). FIG. 2 shows a connection part of the legs R1 and the body R2 as an upper body link 53 simply. The arms R3 and the head R4 are connected to the body R2, and a joint 21 is also provided around the gravity-axis (Z-axis) for swinging the body R2.

The arms R3 are composed by shoulder joints 31R and 31L around the pitch axis (Y-axis) of a shoulder, shoulder joints 32R and 32L around the roll axis (X-axis) of the shoulder, shoulder joints 33R and 33L around the gravity-axis (Z-axis) for swinging the arms R3, arm joints 35R and 35L around the gravity-axis (Z-axis) for swinging the elbow joints 34R and 34L around the pitch axis (Y-axis) of an elbow part, wrist joints 36R and 36L around the pitch axis (Y-axis) of a wrist, and joints 37R and 37L around the roll axis (X-axis) Hands 38R and 38L are attached to the tip of the wrist.

That is, the arms R3 are provided with the shoulder joints 31R(L), 32R(L), 33R(L), the elbow joint 34R(L), the arm joint 36R(L), and the wrist joint 36R(L). The shoulder joints 31R(L) to 33R(L) are connected to the elbow joint 34R(L) by an upper arm link 54R(L), and the elbow joint 34R(L) is connected to the wrist joint 36R(L) by a lower arm link 55R(L).

The head R4 has a neck joint 41 for changing the tilt angle of the head R4, and a neck joint 42 for changing a pan.

When this configuration is employed, a total of twelve freedom degrees can be imparted to the right and left feet of the legs R1. A desired movement can be imparted to the whole leg by driving the twelve (6×2) joints at a proper angle during a walk, and the robot can walk around three-dimensional space arbitrarily (herein, "×" means multiplication). Seven freedom degrees can also be respectively given to the left and right arms R3, and the desired work can be performed by driving these joints at a proper angle.

As shown in FIG. 2, a known six axial force sensor 61 is provided at the leg 17R(L) of the lower part of the ankle joint. The sensor 61 detects, among the external force acting on the robot, the three direction components Fx, Fy and Fz of the floor reaction force acting on the robot detected from the floor surface, and the three direction components Mx, My and Mz of the moment A six axial force sensor 62 of the same kind is provided between the wrist joint and the hand 38R(L), and detects the three direction components Fx, Fy and Fz of the reaction force of the object and three direction components Mx, My, and Mz of moment received from the other external force acting on the robot, particularly a work object.

An inclination sensor 63 is set on the body R2, and the inclination to the gravity-axis and its angular velocity are detected. The electric motor of each joint relatively displaces the thigh link 51R(L) and the lower thigh link 52R(L) or the like via a reducer (not shown) for reducing and increasing the output, and the amount of rotation is detected by a rotary encoder (not shown).

A control unit 100 or the like is stored in the controlling device mounting part R5, and the output (only the right side of the robot R is shown for convenience of illustration) such as the sensors 61 to 63 is transmitted to the control unit 100. Each electric motor is driven by a drive designation signal from the control unit 100. The control unit 100 is equivalent to the robot control device of the present invention.

Figure 3:
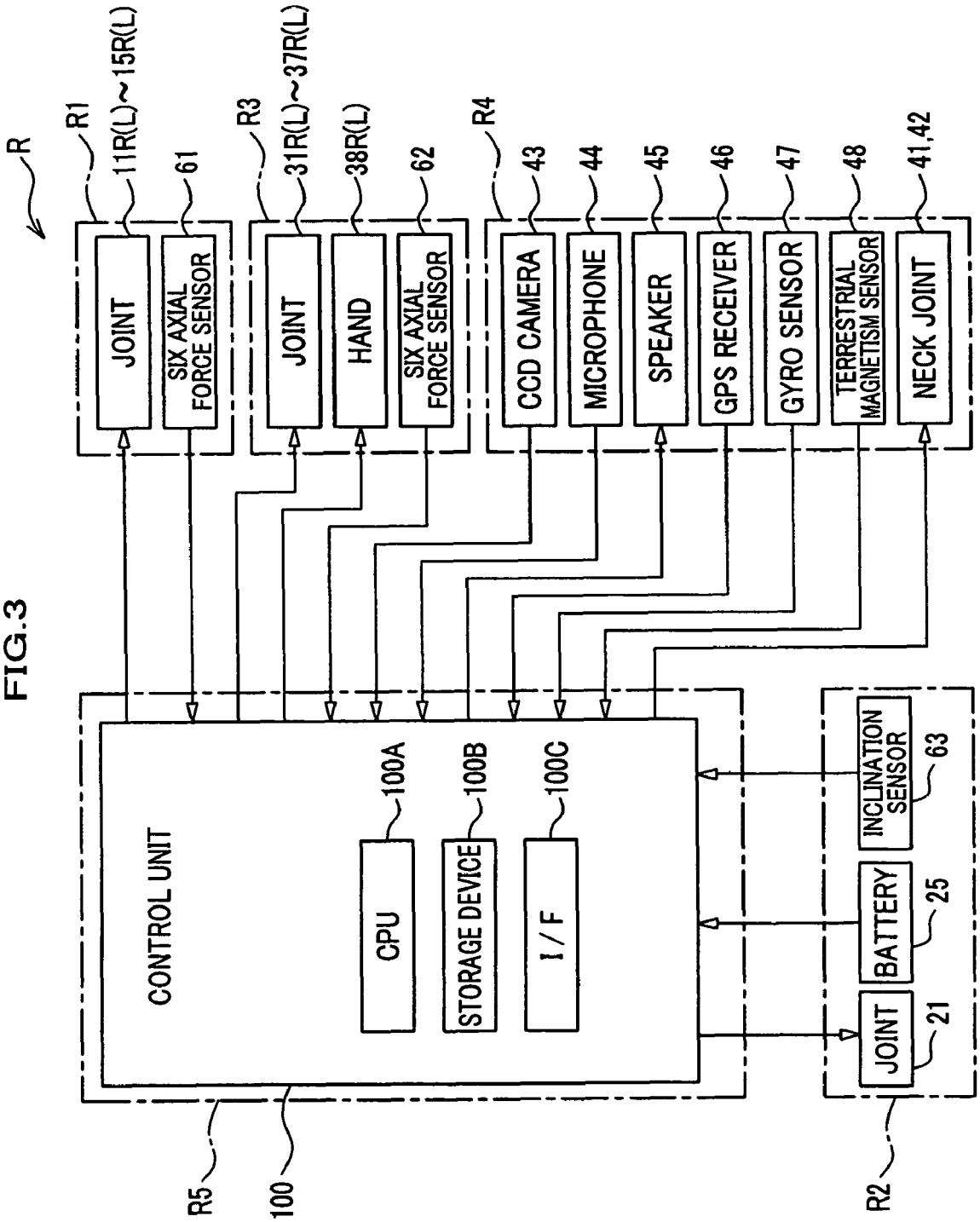
FIG. 3 is a block diagram of the robot.

Next, the constitution of the robot R will be explained with reference to FIG. 3. FIG. 3 is a block diagram of the robot R. As shown in FIG. 3, in the robot R, the control unit 100 stored in the controlling device mounting part R5 is the center of the control. After a signal is inputted to the control unit 100 from a sensor provided at each part, and the control unit 100 decides the behavior of the robot R based on the inputted detection value, the control unit 100 calculates a drive control value of each joint or the like and operates each joint or the like.

The control unit 100 is a computer having a Central Processing Unit (CPU) 100A, a storage device 100B and an input/output interface (I/F) 100C, and performs each function to be described by processing information inputted along a program stored in the storage device 100B.

The legs R1 are provided with the above joints 11R(L) to 15R(L), and the six axial force sensor 61. The detection signal of the six axial force sensor 61 is inputted into the control unit 100, and the joints 11R(L) to 15R(L) are driven by the control unit 100.

The body R2 is provided with a battery 25 in addition to the above joint 21 and inclination sensor 63. The electric power of the battery 25 is supplied to each joint via the control unit 100. The detection signal of the inclination sensor 63 is inputted into the control unit 100, and the joint 21 is driven by the control unit 100.

The arms R3 are provided with the above joints 31R(L) to 37R(L), the hand 38R(L) and the six axial force sensor 62. The detection signal of the six axial force sensor 62 is inputted into the control unit 100, and the joints 31R(L) to 37R(L) and the hand 38R(L) are driven by the control unit 100.

The head R4 is provided with the CCD (Charge-Coupled Device) camera 43 as the sensor, the microphone 44, a GPS (Global Positioning System) receiver 46, a gyro sensor 47, a terrestrial magnetism sensor 48, and the speaker 45 for utterance in addition to the above neck joints 41 and 42.

The CCD camera 43 is equivalent to "imaging device" described in Disclosure of the Invention, and the GPS receiver 46, the gyro sensor 47 and the terrestrial magnetism sensor 48 are equivalent to "self-position detection device". The self-position detection device is not limited thereto, and it is unnecessary to be provided with all of them. For example, only the gyro sensor 47 may be provided, and conversely the other device may be further provided.

The detection signals from the CCD camera 43, the microphone 44, the GPS receiver 46, the gyro sensor 47 and the terrestrial magnetism sensor 48 are inputted into the control unit 100, and the neck joints 41 and 42 and the speaker 45 are driven by the control unit 100.

Figure 4:
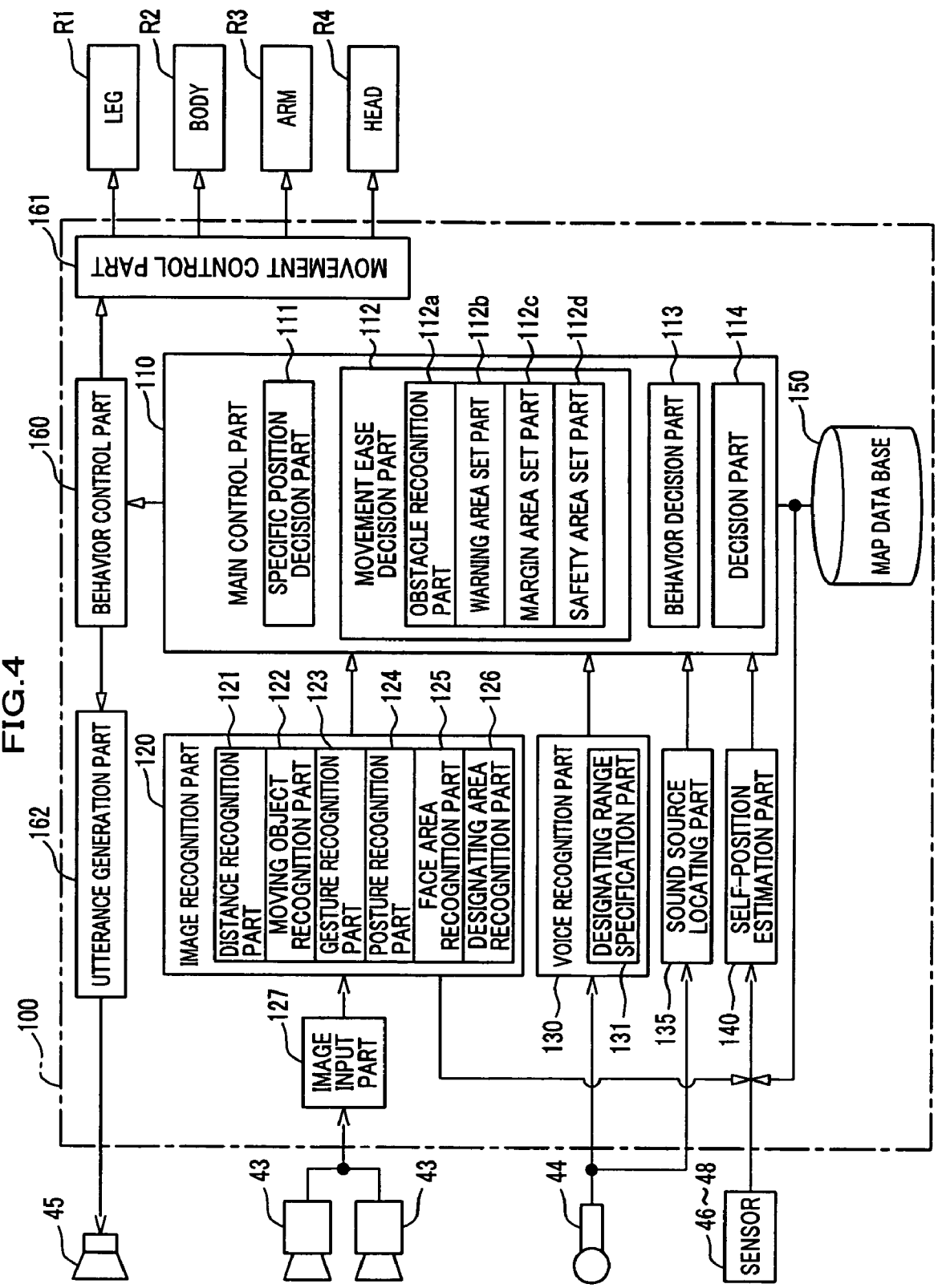
FIG. 4 is a functional block diagram showing the internal constitution of a control unit.

Next, the internal constitution of a control unit 100 will be explained in detail. FIG. 4 is a functional block diagram showing the internal constitution of the control unit 100. The function of each constituent part illustrated in the control unit 100 is realized by the operation processing performed by a CPU 100A based on the program and data stored in the storage device 100B of FIG. 3. The sensors 61 to 63 are omitted in FIG. 4.

As shown in FIG. 4, the control unit 100 is mainly provided with an image recognition part 120, a voice recognition part 130, a self-position estimation part 140, a map data base 150, a main control part 110 deciding the behavior based on the information, and a behavior control part 160 for controlling the behavior according to the decision of the main control part 110.

The image recognition part 120 is equivalent to "image recognition means" described in Disclosure of the Invention, and the voice recognition part 130 is equivalent to "voice discriminating means".

The imaged images imaged by two CCD cameras 43 and 43 are inputted via an image input part 127, and the image recognition part 120 recognizes the designation or the like of the designator from the imaged images.

The CCD cameras (imaging device) 43 and 43 consist of right and left cameras so as to acquire the information of the parallax, and the image imaged by each camera is inputted into the image input part 127. The CCD cameras 43 and 43 are equivalent to the right and left eyes of the robot. The CCD cameras 43 and 43 are provided at head R4 of the robot R so that the CCD cameras 43 and 43 are directed in the same direction (the optical axes are parallel with each other) at a prescribed interval between each other.

The image input part 127 digitalizes and takes an image using a frame grabber.

The image recognition part 120 has a distance recognition part 121, a moving object recognition part 122, a gesture recognition part 123, a posture recognition part 124, a face area recognition part 125, and a designating area recognition part 126 so as to recognize the designation of the designator correctly.

The distance recognition part 121 makes the parallax of the imaged images of the same time taken from two CCD cameras 43 and 43 reflect as distance information (more correctly, information on the distance from the focal position of the CCD cameras 43 and 43 to the imaged object) from the CCD cameras 43 and 43 to the imaged object, and generates a distance image.

The parallax is calculated by using one CCD camera 43 as a standard camera (for example, right camera), and by performing the block matching of the image imaged by the right camera and the image imaged by the left camera at the same time in a block (for example, 16×16 pixels) having a specific size. The distance image corresponding to the size (the amount of the parallax) of the parallax to each pixel of the standard imaged image is generated.

When the parallax is set to Z, the focal length of the CCD camera 43 is set to f, and the distance between the right camera and the left camera is set to B, the distance D from the CCD camera 43 corresponding to the parallax Z to the object can be calculated by the following (1) formula.

$$D = B \times f/z \tag{1}$$

The CCD cameras 43 and 43 are not limited to two terminals, and a visible distance may be calculated by using three or more cameras. For example, nine cameras are arranged in 3 rows by 3 lines, and the camera arranged at the center is used as a standard camera. The distance to the imaged object can also be more correctly measured based on the parallax of the standard camera and other cameras.

The moving object recognition part 122 recognizes a moving object such as the designator, an animal and a car in the imaged images inputted from the image input part 127. For example, an optical flow is obtained from the difference between two frames having continuous or arbitrary intervals, and the moving object is extracted in the imaged images.

The gesture recognition part 123 has a function for recognizing the gesture performed by the designator with designation due to the utterance from the imaged images. For example, as described in Japanese Patent Application No. 2002-077673 (Japanese Published Unexamined Patent Application 2003-039365) as a patent application that the applicant has filed, the gesture recognition part may be provided with an image sensor (CCD camera) for recognizing a moving object, a human identification part for recognizing a human from an image caught by an image sensor, a hand recognition part for recognizing the hand of the human, and a comparison part for comparing the motion of the hand identified by the hand recognition part with the characteristic motion of the hand previously stored to recognize a gesture.

The posture recognition part 124 has a function for recognizing the posture when the designator designates. For example, as described in Japanese Patent Application No. 2002-234066 as the patent application that the applicant has filed, the posture recognition part may be provided with a contour extraction means for extracting the contour of an object being the candidate of a human from the imaged images, a distance calculation means for calculating a distance to the object being the candidate of a human from distance information at every pixel in the contour in the imaged images, a searching means searching the candidate of a hand of a human on the basis of the distance between the contour and the object of the contour, and a posture decision means for deciding an instruction corresponding to a relative position between the candidate of the hand and the contour and setting a decided result to be a posture recognition result.

The face area recognition part 125 has a function for detecting the area of the face of the designator from the imaged images. For example, as described in Japanese Patent Application No. 2001-013818 (Japanese Published Unexamined Patent Application 2002-216129) as the patent application that the applicant has filed, the face area recognition part 125 may be provided with an extraction means for extracting a flesh color area from color images imaged by a CCD camera 43, a contour model generation means for using the distance image having the depth information of the color image to impart the contour of the face area, and a face area specification means for using correlation among the contour model and the flesh color area to specify the face area.

The designating area recognition part 126 has a function for recognizing the posture or eye gaze detection of the designator using the imaged images to detect the designating area from the designator. For example, as described in Japanese Patent Application No. 2002-231899 as the patent application that the applicant has filed, the designating area recognition part 126 may be provided with means for detecting the head position of the designator including at least distance information based on the imaged images, means for detecting the position of the hand of the designator including at least distance information based on the imaged images, means for calculating the positions of the fingers and the main axis of the hand based on the detected hand position, and means for detecting the direction designated by the designator based on the detected head position and the detected finger positions and the main axis of the hand. Also, the designating area recognition part 126 may be provided with means for detecting the position of the eye based on the head position, and thereby the direction designated by the person based on the eye position, the finger positions and the main axis of the hand may be detected.

As one example, as explained intuitively, the direction vector of the hand can be decided from the main axis of the hand, and the designated direction (position) can be decided from the direction vector of the hand and the synthetic vector of the vector connecting the eye to the hand.

The voice recognition part 130 has a function for recognizing a voice signal from the microphone 44 to recognize the command and intention of a human, with reference to the vocabulary previously registered. The voice recognition part 130 has a designating range specification part 131 (designating range specifying means). The designating range specification part 131 has a function for narrowing the area specified by the reference term such as "here" and "that way".

The voice recognition part 130 refers to the distance or the like of the designator and robot R recognized by the image recognition part 120, and specifies the area shown by the reference term. One example of the processing will be explained with reference to FIG. 5 and FIG. 6.

Figure 5:
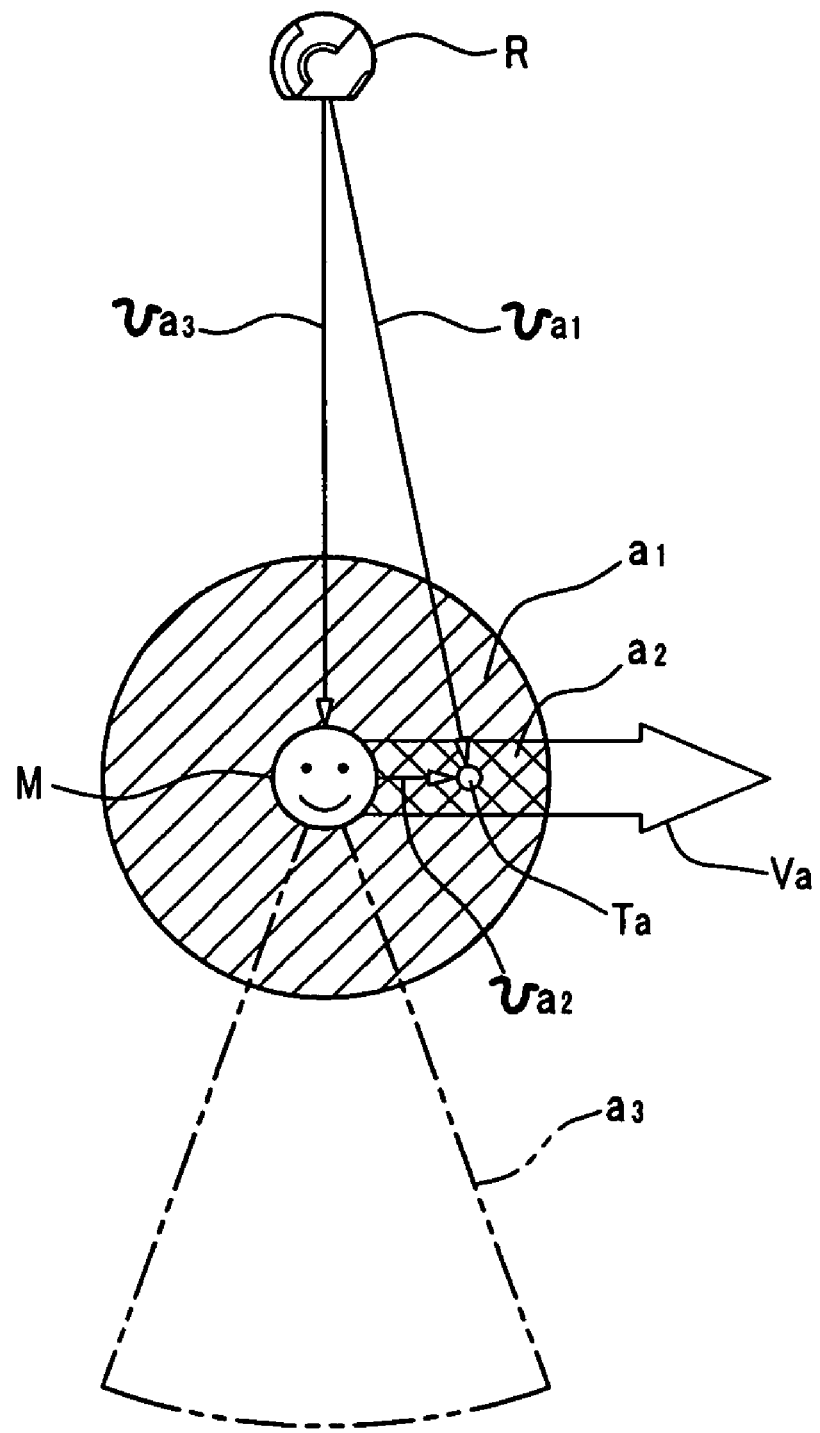
FIG. 5 explains the narrowing of the designating range due to a reference term.

For example, FIG. 5 explains the narrowing of the designating range due to the reference term.

As shown in FIG. 5, when the designator M says "here", "this", "this way" and "this one" or the like in the state where the designator M is sufficiently distanced from the robot R, the designator M usually specifies a location and object near the designator M, and thereby "here", "this", "this way" and "this one" mean the distance near the designator M, for example, an area $a_1$ (shadow area) where the range having the radius of 1 m centering on the designator M is narrowed.

The designating range specification part 131 recognizes as the term for recognizing the location when the designator says "here". When the designator says "this one", the designating range specification part 131 recognizes as the term recognizing the object. When the designator says "here" and "this" or the like vaguely, the designating range specification part recognizes synonymously with "here" and "this one", and recognizes as the term (this way) showing the direction. Although the deciding method of the specific position is described below, when the position of an object Ta is decided as the specific position, an arrow $va_1$ directing to the object Ta from the robot R, and an arrow $va_r$ directing to the object Ta from the designator M can be recognized as the direction designated by "this" or "this way". When the object is not particularly found, since the designator M designates the circumference vaguely, the specific position is the position of the designator M. The meaning of "this" or "this way" can be recognized as an arrow $va_3$ directing to the designator M.

Figure 6:
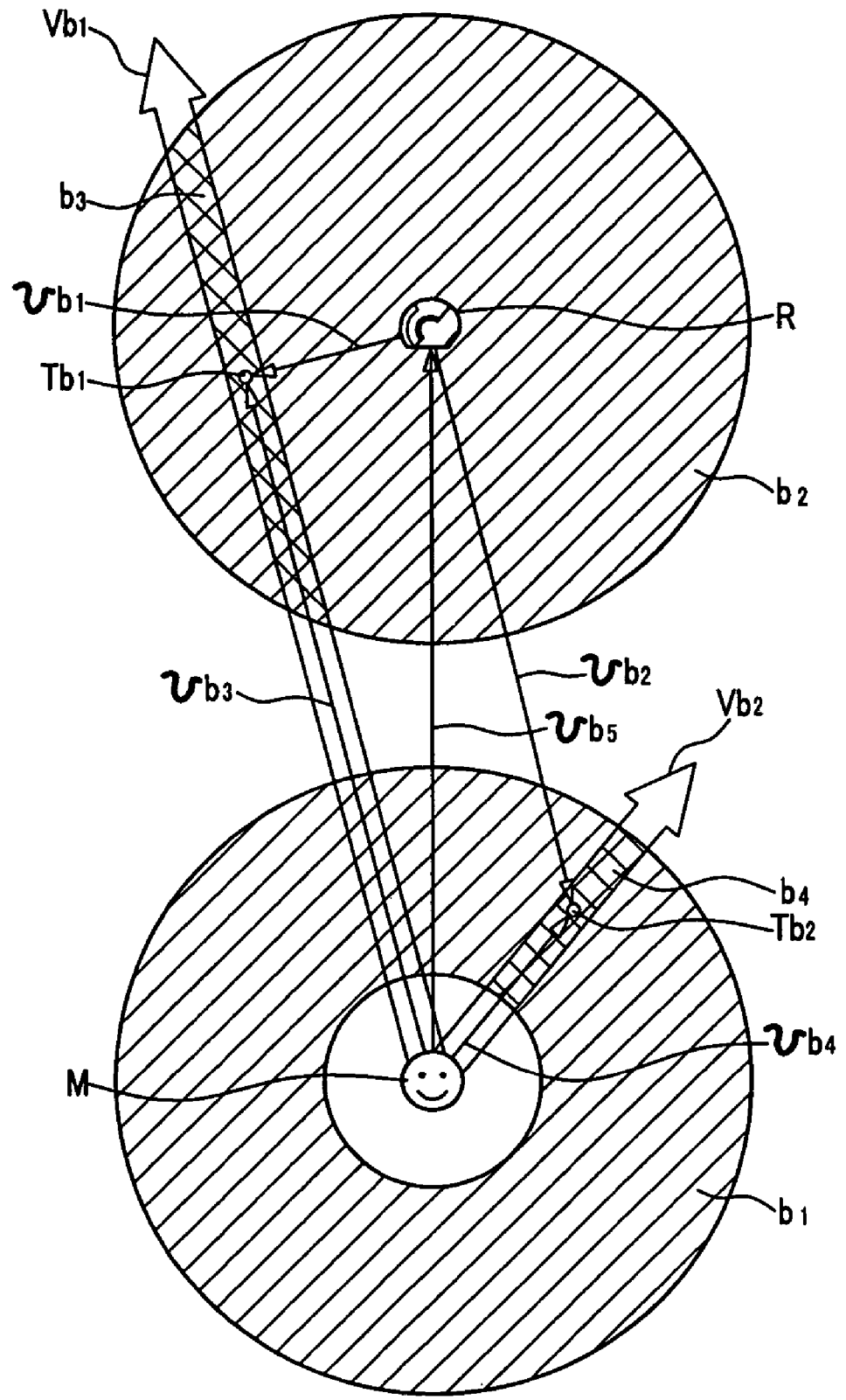
FIG. 6 explains the other narrowing of the designating range due to the reference term.

As shown in FIG. 6, when the designator M says "there", "that," "that way" and "that one" or the like in the state where the designator M is sufficiently distanced from the robot R, the designator M usually specifies a location and object located at some distance from the designator M, and thereby "there", "that", "that way" and "that one" mean a far distance than one designated by "here", "this", "this way" and "this one" and the circumference in which a partner is present usually. Then, for example, an area $b_1$ (shadow area) of a circle having a radius of 1 m to 3 m centering on the designator M, and an area $b_2$ (shadow area) of a circle having a radius of 3 m centering on the robot R becomes the area narrowed.

The designating range specification part 131 recognizes "there" as the term for recognizing the location when "there" is said. The designating range specification part 131 recognizes "that" as the term for recognizing the object when "that" is said. The designating range specification part 131 recognizes "that way" and "that one" or the like as being synonymous with "there" and "that", and recognizes as the term showing the direction. Although the deciding method of the specific position is described below, when the positions of the object $Tb_1$ and object $Tb_2$ are decided as the specific position, an arrow $vb_1$ and arrow $vb_2$ directing to the object $Tb_1$ and the object $Tb_2$ from Robot R, and an arrow $vb_3$ and arrow $vb_4$ directing to the object $Tb_1$ and the object $Tb_2$ from the designator M can be recognized as the direction designated. When the object is not particularly found, the position distant to some extent vaguely is shown, and for example, the specific position may be recognized as the position of the robot R. In this case, the "that way" and "that one" can be recognized as an arrow $vb_5$ directing to the robot R.

In a cultural sphere using languages such as Japanese, since there are languages such as "there", "that", "that way" and "that one" (containing "farther down there" and "over there" in English) indicating a more distant area than the latter as reference terms corresponding to "here", "this", "this way"

and "this one" or the like, a third area is set by the same method as described above using these reference terms.

That is, when "there", "that", "that way" and "that one" or the like are said (when the reference term containing "farther down there" and "over there" or the like is used), an area more distant than the area designated by "there" and "that one" is usually designated. The area outside the areas $b_1$ and $b_2$ shown in FIG. 6 becomes the area narrowed. For example, the area is the outside of a circle centering on the designator M and having a radius of 3 m, and is the outside of a circle centering on the robot R and having a radius of 3 m.

As described above, the designating range specification part 131 recognizes as the term recognizing the location by the reference term used, and recognizes as the term recognizing the object, or recognizes as the term showing the direction. The direction of the specific position decided by the specific position decision part 111 from the designator M, and the direction of the designation recognized by the image recognition part 120 is recognized as the direction designated by the reference term.

How to decide the area designated by the above reference term is changed according to the distance between the designator M and the robot R. For example, when the designator M and the robot R are in a large gymnasium and a large playground or the like, and the distance to each other is 20 m or 100 m or more, the distance as the reference so as to indicate by "this" and "that" or the like is naturally set to a long distance. Even if the designator M is greatly separated from the robot R, the object between the designator M and the robot R is not said as "over there, etc.", and the object is usually said as "that". How to narrow the area corresponding to the reference term is not restricted to the one described above with reference to FIG. 5 and FIG. 6, and how to narrow can be performed by other methods. For example, as shown in FIG. 5, the reference term of "this or this way" can also be recognized as an area $a_3$ of a sector shown by two dotted lines viewed from the robot R and spreading with a predetermined angle behind the designator M. When the robot R is near the designator M, the side near the designator M than the equidistant boundary line from the robot R and the designator M can also be set as the area shown by "here, this" (not shown).

When the designator M is near the robot R, the area narrowed by the reference term "here" and the area narrowed to the reference term "there" overlap. When the overlapping area is designated by any reference term, it means that the object (direction and location) in the area can be recognized.

The sound collected by the microphone 44 is inputted not only into the voice recognition part 130 but into the sound source locating part 135. For example, the sound source locating part 135 detects the position of a sound source by using the microphone 44 as a stereo microphone based on the sound pressure difference between two or more microphones and the difference of the arrival time interval of sound. Whether it is a voice or a crashing sound is estimated from the rising portion of the sound. The estimation results of the sound source, voice and crashing sound estimated by the sound source locating part 135 are outputted to the main control part 110.

The self-position estimation part 140 has a function for presuming the direction directing the self position based on the signals of the above sensors 46 to 48. The self-position estimation part 140 is equivalent to "self-position estimation means" described in the Disclosure of the Invention. When the robot moves within a small room, the self-position in the map of the room from the movement distance calculated from the gyro sensor 47 may be estimated as a method for estimating the self position. At the time of moving outdoors, the detection results of the information of the latitude and longitude detected by the GPS receiver 46, and the direction detected by the terrestrial magnetism sensor 48 may be estimated as the self position as it is. The self-position can also be estimated with high precision by combining the sensors 46 to 48. The self-position can be estimated with high precision by referring to the information of the object recognized by the image recognition part 120 and the map data read from the map data base 150 and by collating the self-position capable of being estimated from the information and the self-position estimated from the sensors 46 to 46.

The map data base 150 retains the map data registering the position of at least the obstacle.

Examples of the obstacles include a desk, a wall, a pillar and a load in a room, and a building and a telegraph pole outdoors. The edge of a stage registered as an obstacle on a stage is convenient for performing smooth movement only on a stage. The robot R does not always need to have the map data base 150, and the map data base 150 may be transmitted to the robot R by wireless communications as needed from the computer having various map data set at another location.

When a motionless object is sequentially updated to the map data of the map data base 150 as the obstacle, as the motionless object is also recognized in the image recognition part 120, it is preferable that it is possible to respond to any change in the situation suitably.

A main control part 110 has the specific position decision part 111, the movement ease decision part 112, the behavior decision part 113 and a decision part 114.

The movement ease decision part 112 is equivalent to "movement ease decision means" described in the Disclosure of the Invention, and the behavior decision part 113 is equivalent to "behavior decision means". The decision part 114 is equivalent to "decision means".

The specific position decision part 111 has a function for deciding the specific position designated by the designator as the target area of movement from the designating area (hereinafter, referred to as "image recognition designating area") of the designator recognized by the image recognition part 120, and the area (hereinafter, referred to as "voice recognition designating area") designated by the designator narrowed by the voice recognition part 130.

The deciding method of the specific position due to the specific position decision part 111 has three cases, for example.

First, when the image recognition designating area and the voice recognition designating area do not agree, that is, as a result of calculating the area of both logical products, no areas remain, the decision that the specific position cannot be recognized is performed.

Second, when the object is in the area narrowed by the logical product of the image recognition designating area and voice recognition designating area, the position of the object is decided as the specific position. If the designation regards "object" like "Please take the ball", the object as applicable is always searched from the narrowed area. As a result of searching, when a plurality of objects, for example, balls exist, a suitable object may be selected from the balls, and may be inquired to the designator. When the object is not found, it is decided that the specific position cannot be recognized.

When the second case is illustrated, for example, the case is shown in FIG. 5. As shown in FIG. 5, the logical product of the area $a_1$ narrowed as the voice recognition designating area and the area (there is also a case of a direction having a certain width and a position having a certain area) Va specified as the image recognition designating area is respectively taken, and the position of the object Ta in the area $a_2$ narrowed by the logical product is set to the specific position.

Third, when no object exists in the area narrowed by the logical product of the image recognition designating area and voice recognition designating area, there is also a method for obtaining the centroid position of the narrowed area by estimate and setting the centroid position to the specific position. Of course, one point of the area narrowed by other geometric methods, for example, the point or the like nearest to the designator M may be decided to be the specific position.

When the third case is illustrated, for example, the case is shown in FIG. 6. As shown in FIG. 6, the areas $b_2$ and $b_3$ are specified by the logical product of the areas (there is also a case of a direction having a certain width and a position having a certain area) $V_{b1}$ and $V_{b2}$ narrowed as the image recognition designating area of the areas $b_1$ and $b_2$ narrowed as the voice recognition designating area, and each center of gravity of the areas $b_2$ and $b_3$ is set to the specific positions $Tb_1$ and $Tb_2$.

The movement ease decision part 112 decides the ease of movement to the specific position decided by the specific position decision part 111. The movement ease decision part 112 has an obstacle recognition part 112a, a warning area set part 112b, a margin area set part 112c and a safety area set part 112d for this function. Each of these constitutions will be explained with reference to FIG. 7.

Figure 7:
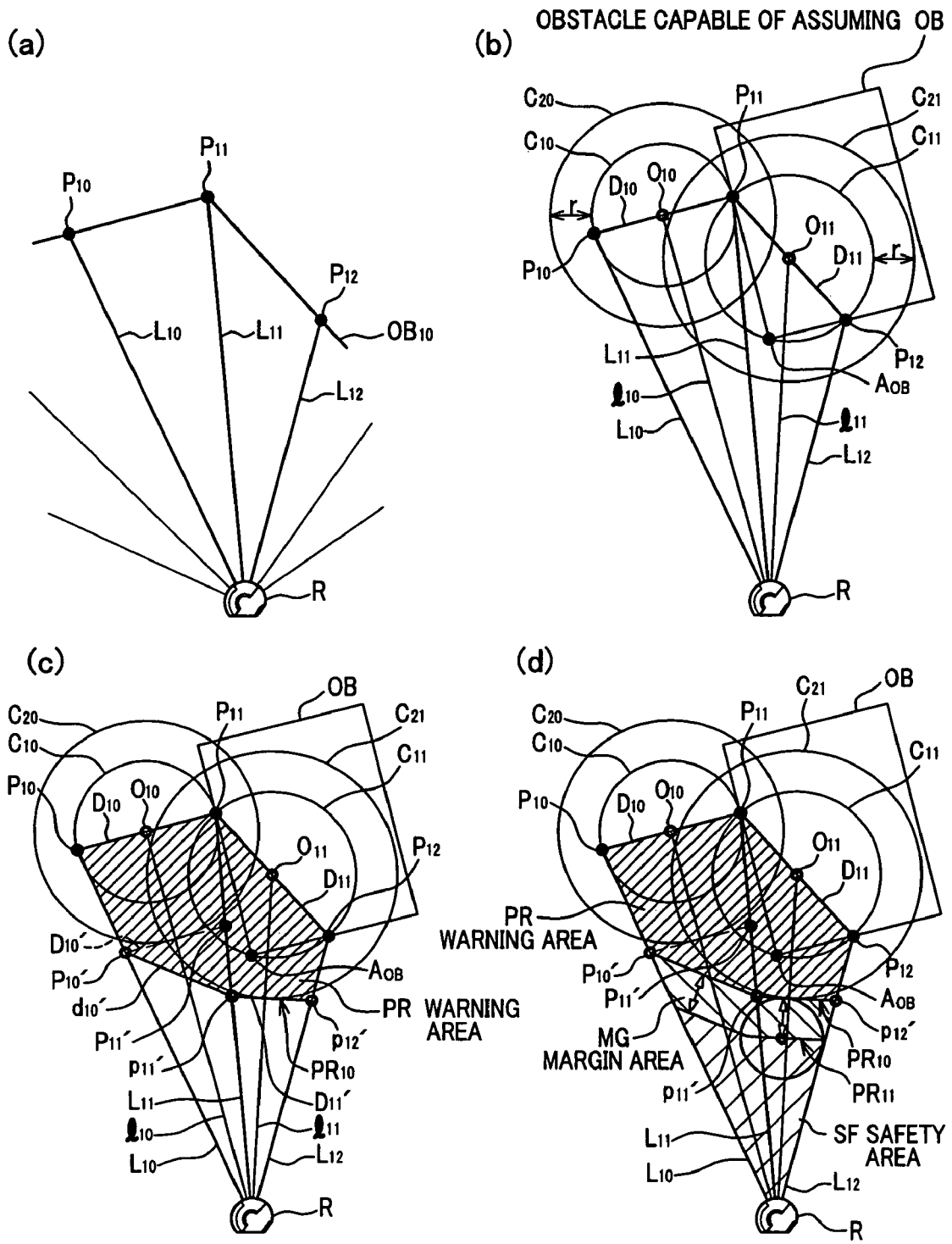
FIG. 7 explains a method for setting an area.

The obstacle recognition part 112a (obstacle recognition means) has a function for recognizing the position of the obstacle on the map data around the current position of the robot R read from the map data base 150. In particular, as shown in FIG. 7A, the robot R is set as the center, and it is assumed that the straight lines are drawn in a radial pattern at every equal angle (for example, 360 degrees/128). The intersection of this straight line and the surface of the obstruct is obtained. When the surface (boundary) of the obstacle is registered as a vector in the map data, the intersection can be easily obtained. The position of the obstacle around the robot can be recognized by the intersection group. For example, in FIG. 7, the boundary line $OB_{10}$ of the obstacle and the intersections $P_{10}$, $P_{11}$ and $P_{12}$ of the radial straight lines $L_{10}$, $L_{11}$ and $L_{12}$ from the robot R are recognized as the position of the obstacle.

The warning area set part 112b (warning area set means) has a function for setting the area which may interfere with an obstacle as the warning area PR if the robot exists from the intersection group obtained by the obstacle recognition part 112a. So as to set the warning area PR, the entire surface of the obstacle is not necessarily restricted to the straight line (plane) shown in FIG. 7A, and the map data may not reflect the actual condition correctly by irregularity and "gap" or the like of the obstacle.

In particular, as shown in FIG. 7B, the circle obtained by setting a distance between adjacent intersections as a diameter is drawn, and a straight line is drawn so as to pass the center of the circle and position of the robot R. For example, in FIG. 7, a circle $C_{10}$ obtained by setting a line segment $D_{10}$ connecting an intersection $P_{10}$ to an intersection $P_{11}$ as a diameter is drawn, and a circle obtained by setting a line segment $D_{11}$ connecting an intersection $P_{11}$ to an intersection $P_{12}$ as a diameter is drawn. Herein, the circle obtained by setting the distance between the intersections as the diameter is drawn since the artificial material has generally a right-angled corner like the obstacle which is shown by numeral OB and can be assumed, and the range existing so that the artificial material overhangs to the robot side is obtained.

The circles $C_{20}$ and $C_{21}$ which have the same center as the circle $C_{10}$ and the circle $C_{11}$ and are respectively larger by only the radius r are drawn. This radius r is suitably set based on the size or the like of the robot R.

As described later in detail, the warning area PR is set to the area spreading to the side of a line segments $D_{10}$ and $D_{11}$ from the angle AOB of this virtual obstacle OB. Since the possibility that the robot R interferes with the obstacle OB becomes lower when the angle of the obstacle OB existing temporarily is roundish, the warning area PR should be decided so that the obstacle OB has a right-angled angle.

A line segment $l_{10}$ connecting the robot R to the center $O_{10}$ of the circle $C_{10}$, and a line segment $l_{11}$ connecting the robot R to the center $O_{11}$ of the circle $C_{11}$ are virtually drawn. As shown in FIG. 7C, intersections $P_{10}'$ and $P_{11}'$ of a line segment $D_{10}'$ perpendicularly intersecting with the line segment $l_{10}$ and coming into contact with the circle $C_{20}$ and straight lines $L_{10}$ and $L_{11}$ are obtained. Similarly, intersections $P_{11}'$ and $P_{12}'$ of a line segment $D_{11}'$ perpendicularly intersecting with the line segment $l_{11}$ and coming into contact with the circle $C_{21}$ and straight lines $L_{11}$ and $L_{12}$ are obtained. On one radial straight line, for example, on the straight line $L_{11}$, the intersection $P_{11}'$ of the side near the robot R is set to the boundary line of the warning area PR among two intersections such as $P_{11}'$ and $p_{11}'$. Thus, to select the intersection of a near side is to select the safer one at the time of movement of the robot R. If such an intersection is connected, the boundary (the boundary line $PR_{10}$ connecting $P_{10}'$-$p_{11}'$-$p_{12}'$) of the warning area PR is decided, and the obstacle side from the boundary is set as the warning area PR.

The margin area set part 112c (margin area set means) sets an area with a predetermined distance from the warning area PR as the margin area MG. In particular, as shown in FIG. 7D, the line $PR_{11}$ retreating from the boundary line $PR_{10}$ of the warning area PR by a predetermined distance at the side of the robot R is obtained, and the area surrounded by the boundary line $PR_{10}$, the boundary line $PR_{11}$, the line segment $L_{10}$ and the line segment $L_{12}$ is set as the margin area MG. Although the robot R can exist in the margin area MG, the margin area MG is an area which the robot may interfere with an obstacle when the robot R moves to the side of the warning area PR slightly. Thereby, the margin area MG becomes the index that the robot R decides so as to respond appropriately at the time of movement to the location.

The predetermined distance for being retreated is suitably set by the size, shape, function, movement speed, braking distance or the like of the robot R. For example, in a human-type robot, the predetermined distance is set to 90 cm by taking the quantity of the swinging of the hand to the shoulder width into consideration.

The safety area set part 112d (safety area set means) sets the area further distant from the above margin area MG as the safety area SF from the obstacle. In particular, as shown in FIG. 7D, the area (the area near the robot R than the boundary line $PR_{11}$) surrounded by the boundary line $PR_{11}$, the line segment $L_{10}$ and the line segment $L_{12}$ is set as the safety area SF.

Figure 8:
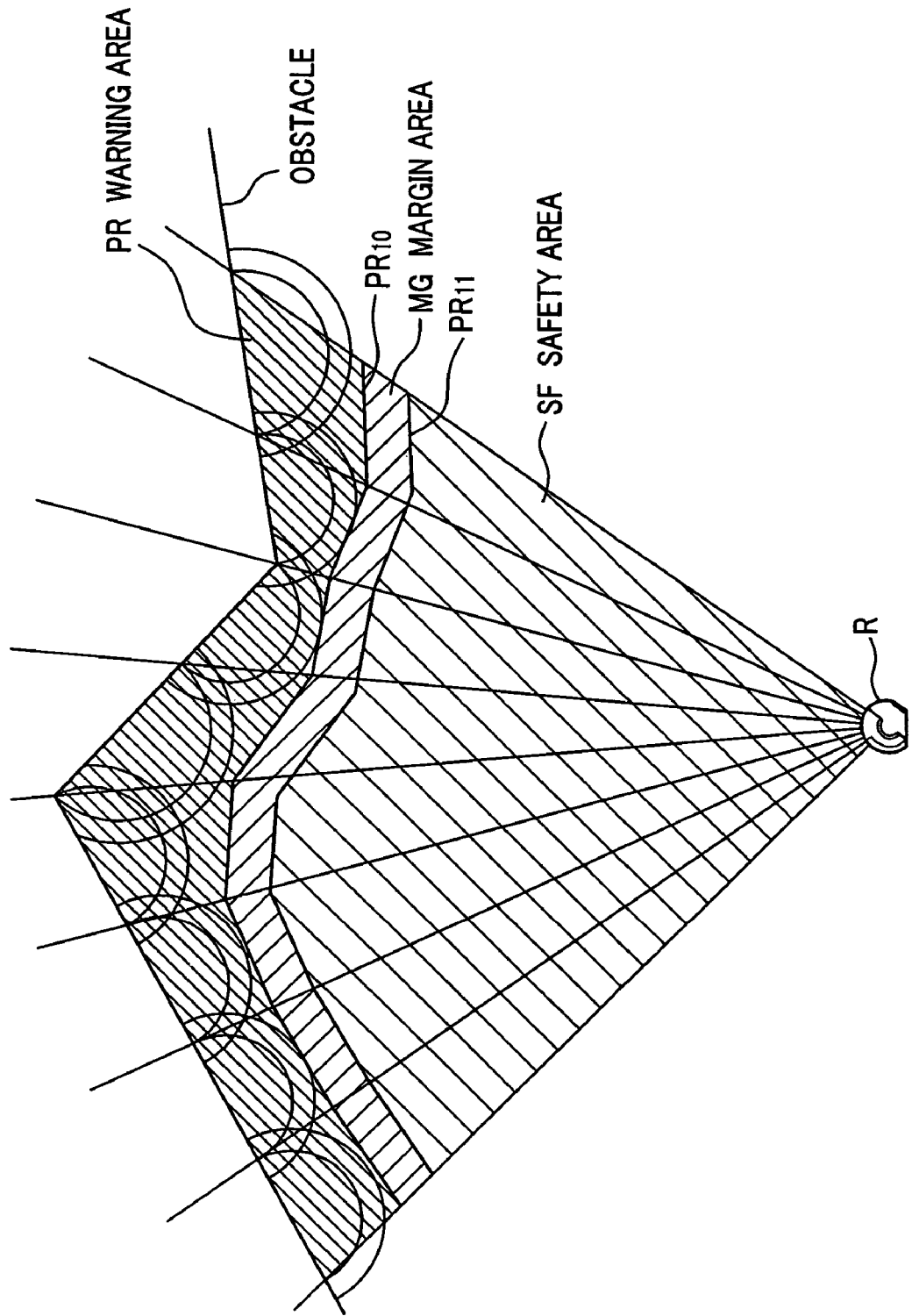
FIG. 8 shows one example setting the warning area, the margin area and the safety area around the robot.

Thus, the example divided into the warning area PR, the margin area MG, and the safety area SF for a certain range is shown in FIG. 8. In FIG. 8, the obstacle side from the boundary line $PR_{10}$ is set to the warning area PR, and the margin area MG is set between the boundary line $PR_{10}$ and the boundary line $PR_{11}$. The side near the robot R from the boundary line $PR_{11}$ is set to the safety area SF, and thereby the map data is divided into three areas. It is unnecessary to perform the division of this area over the entire circumference of the robot R, and the designator should perform for only the circumference of the specific position designated as a movement target ground. Thus, the calculation load becomes light by performing the area division only for the required range (width). Of course, the width for calculating the area division may be suitably set according to the operation capability of CPU 100A, the move capability of the robot R, the width of movement environment and the number of the obstacles in the environment or the like. As illustrated in FIG. 7C, the warning area PR is not only set based on the perimeter of the obstacle, but it is considered that unevenness and the edge (for example, edge of a stage) of a floor surface making it difficult to walk for the robot R are also an obstacle.

Any area may be expanded or reduced according to the movement without fixing the warning area PR, the margin area MG and the safety area SF. For example, when the robot actually moves to the warning area PR and it does not conflict, the map data base 150 may be updated or the size of the margin area MG or the like may be changed according to movement speed so as to set as the margin area MG from the warning area PR only within the range coming in the warning area PR.

The area set is not restricted to the classifying and setting of the three areas as shown in FIG. 8, and may be classified by setting to other numbers, for example, two and five areas. The movement ease may be continuously decreased as the robot approaches the obstacle, and the robot R may weaken the movement speed gradually according to the decrease. Conversely, for example, when the robot R moves into the safety area SF from the inside of the margin area MG, the movement speed may be increased.

The behavior decision part 113 has a function for deciding the behavior according to the movement ease decided by the movement ease decision part 112. Although various patterns can be set as the operation of the behavior decision part 113, examples of the various patterns include the following.

In examples of the following items (1) to (9), the cases where the movement ease is "difficulty", "caution required" and "safety" can be respectively corresponded with the warning area PR, the margin area MG and the safety area SF when the circumference of the specific position is classified into the above three areas. That is, when the designation that the robot R moves to the warning area PR is given by the designator, the movement ease is set to "difficulty". When the designation that the robot moves to the margin area MG is given, the movement ease is set to "caution required". When the designation that the robot moves to the safety area SF is given, the movement ease is decided to be "safety".

The margin area MG may be made to correspond with "difficulty".

(1) When the movement ease is decided to be "difficulty", behavior for reconfirming the designation is taken to the designator. For example, the robot utters "Since the movement is difficult, the robot does not move", "Can the robot move there really" or "Please designate once again", and "An obstacle is discovered on the course" or the like to the designator, (2) The robot moves toward the specific position designated in the meantime when the movement ease is decided to be "difficulty", and gradually reduces the movement speed as the robot approaches to the low area of safety of the margin area MG and warning area PR from the safety area SF. A method for making a step small as a method for reducing movement speed can be used as an example.

(3) If the robot approaches to the specific position designated at once and approaches to a certain distance when the movement ease is decided to be "difficulty", the robot stops and confirms with the designator. For example, the robot utters "Is this good?", "May I move?" and "An obstacle is discovered on the course" or the like. The robot may be stopped at the boundary of the warning area PR and margin are a MG, and in the safety area SF nearest to the designation position or the margin area MG instead of "Approaching to a certain distance".

When a predetermined time designator does not respond to the inquiry of the robot R, the robot R may ask again, or the robot may utter "Since there is no response, the robot stops in this location". Or the robot may be configured so that the reset behavior of returning to the original position is taken.

(4) When the movement ease is decided to be "caution required", the robot assumes the behavior explained in the items (2) or (3).

(5) When the movement ease is decided to be "difficulty", the robot corrects the specific position used as the movement destination automatically to the area of "caution required", and moves subsequently.

(6) When the movement ease is decided to be "caution required", the robot corrects the specific position used as the movement destination automatically to the area of "safety", and moves subsequently.

(7) When the movement ease is decided to be "difficulty" or "caution required", the robot designates the choices of the operations to a designator and waits for the designation. For example, the robot utters "Which would you select from stop, one-step movement, automatic correction and continuation" or the like.

(8) When the movement ease is decided to be "difficulty" or "caution required", the robot changes into the secure method of the operation of legs. For example, even if the robot usually performs the operation of legs due to dynamic walking, the robot changes into the operation of legs due to static walking.

(9) When the movement ease is decided to be "safety", the robot moves to the designated specific position.

When the behavior decision part 113 compares the designation recognized by the image recognition part 120 with the designation recognized by the voice recognition part 130, and the designation content is contradictory (for example, the image recognition designating area and the voice recognition designating area do not overlap at all), the behavior decision part 113 decides the behavior or the like of inquiry to the designator. In such a case, it is decided to utter, for example, "please designate once again" or the like.

The behavior decision part 113 decides the following behavior of the Robot R according to the information inputted one after another from not only the decision of the behavior to the movement designation but the image recognition part 120 and the voice recognition part 130 or the like. For example, when the designator talks, the sound source locating part 135 outputs the information of the position of the sound source, according to the input of the signal, and decides the behavior so as to change the direction of the robot R to the direction of the sound source.

The decision part 114 decides whether the movement to the specific position is required based on the recognition result of the voice recognition part 130 and the image recognition part 120.

The behavior control part 160 outputs the designation of the behavior to the utterance generation part 162 and the movement control part 161 according to the behavior decided by the main control part 110.

The movement control part 161 outputs the drive signal to the actuator (joint) of each part of the legs R1, the body R2, the arms R3, and the head R4 according to the designation of the behavior control part 160, and moves robot R. For example, the walk control of the robot R according to designation of the behavior control part 160 is realized using a technique disclosed in Japanese Published Unexamined Patent Application H10-217161 that the applicant has filed.

The utterance generation part 162 synthesizes the sound signal which should be uttered from character string data which is stored in the storage device 100B and should be uttered according to the designation of the behavior control part 160, and outputs the signal to the speaker 45.

Figure 9:
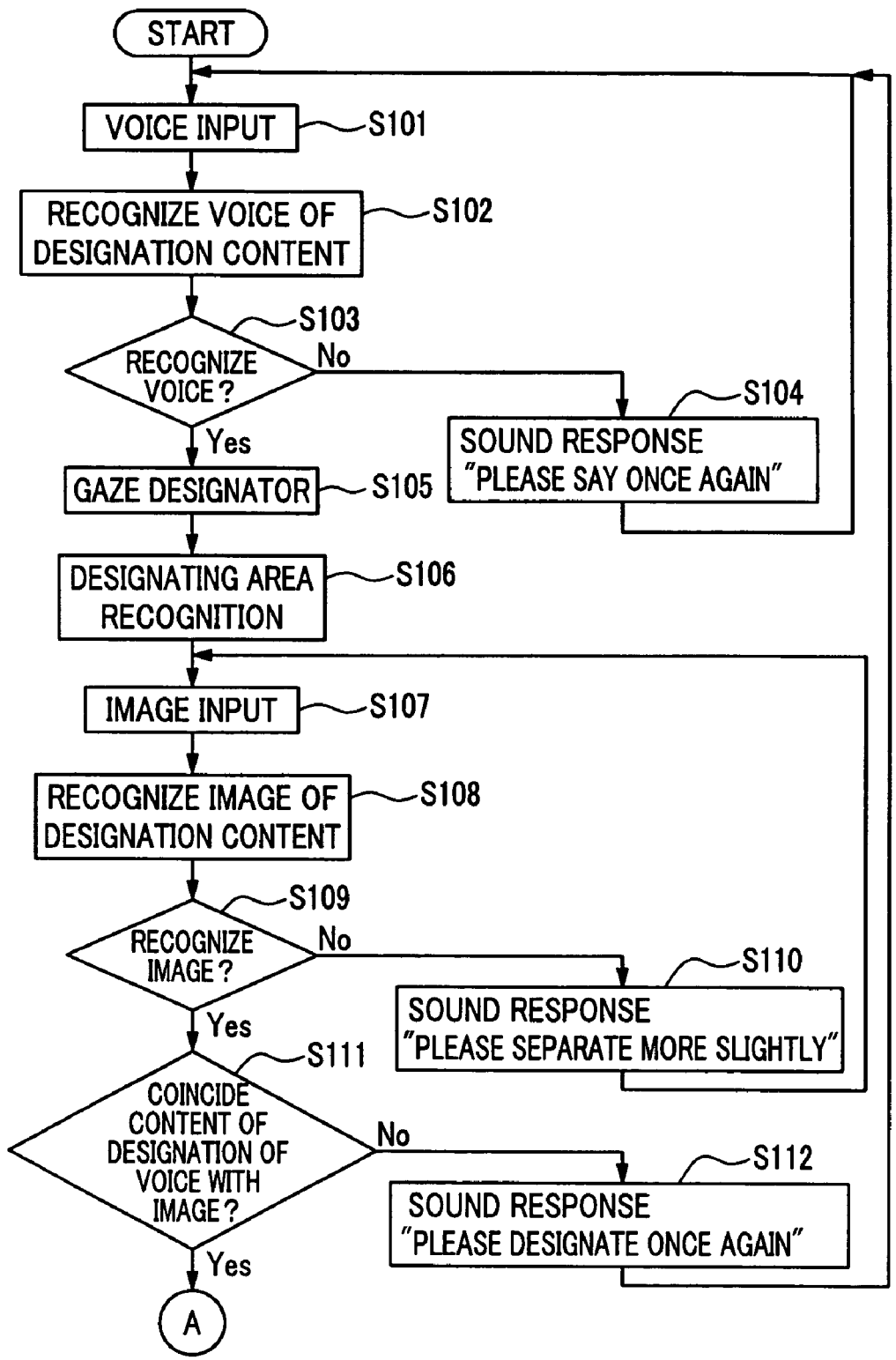
FIG. 9 is a flowchart showing a processing until the designation is recognized.
Figure 10:
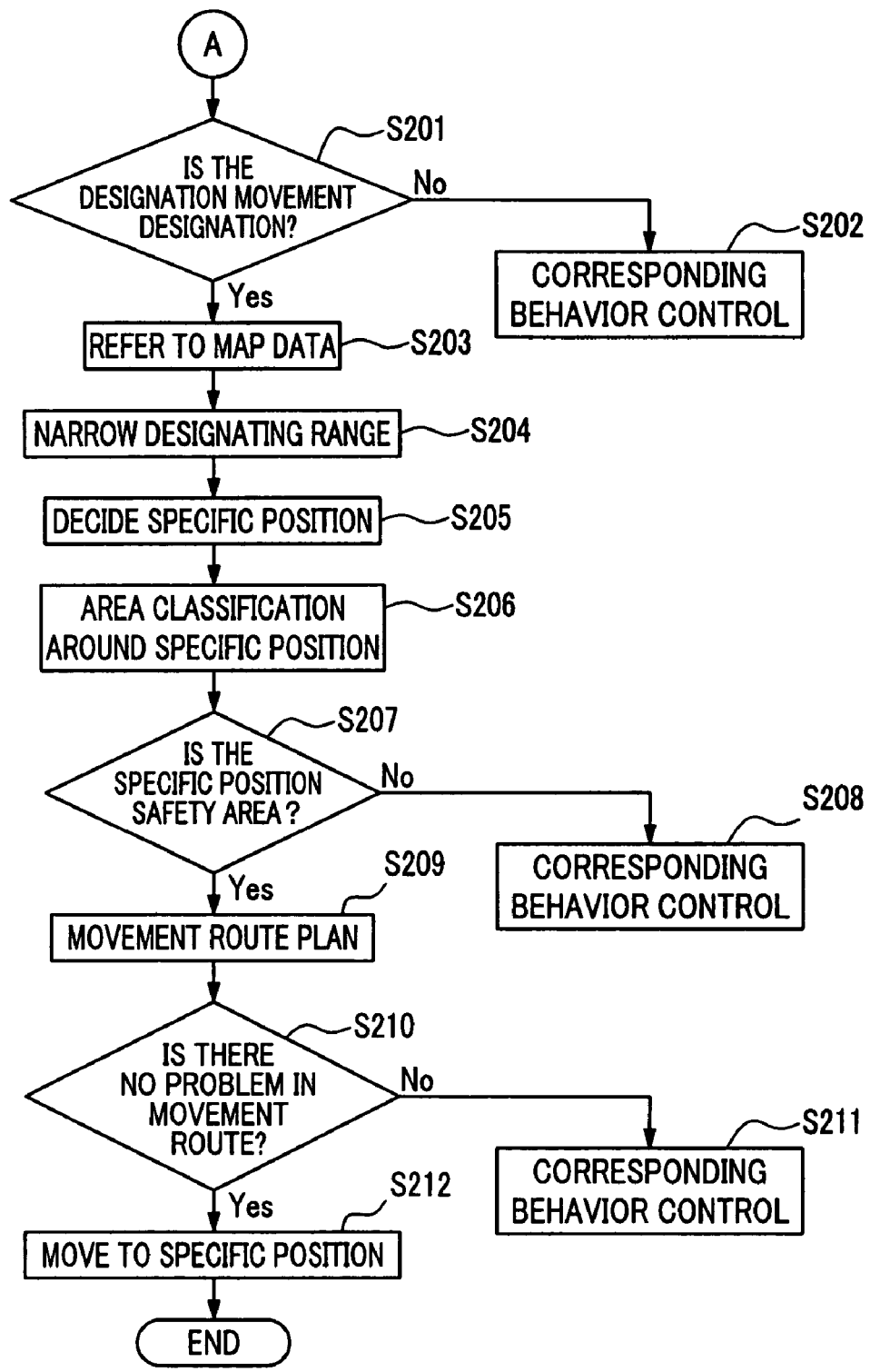
FIG. 10 is a flowchart showing a response processing to the recognized designation.

The operation of the robot R (control unit 100) configured as described above will be explained with reference to the flowcharts shown in FIG. 9 and FIG. 10. FIG. 9 is a flowchart showing a processing until the designation is recognized. FIG. 10 is a flowchart showing a response processing to the recognized designation.

First, with reference to FIG. 9, processing (designation content discriminating step) until the designation is recognized is explained.

When the designator designates using the voice and gesture to the robot R, the voice is inputted from the microphone 44 (Step S101). The voice is recognized as language by the voice recognition part 130, and the position of the sound source (designator) is recognized in the sound source locating part 135 (Step S102). Next, as a result of the recognition of the designation content due to the voice, the main control part 110 decides whether the contents whose the meaning is understood is recognized (Step S103). Since a listening mistake occurs when the meaning is not understood (Step S103, No), the main control part 110 (behavior decision part 113) decides to ask back to the designator, and the response of confirmation is performed by the voice to the designator from the speaker 45 through the behavior control part 160 and the utterance generation part 162. For example, "say once again" is uttered (Step S104).

When the content whose the meaning is understood can be recognized (Step S103, Yes), the direction of the robot R is changed so that the robot R gazes at the position of the sound source (designator) recognized by the sound source locating part 135 (Step S105). A voice recognition processing and a designator gaze processing may be simultaneously performed.

The range designated by the voice reference term is narrowed by the designating range specification part 131 (Step S106, designating range specification step). For example, if the designation is "please pick up the ball there", the designating range is narrowed to the range shown by $C_1$ of FIG. 5C by extracting the reference term "there".

Next, the image imaged by the CCD camera 43 is inputted via the image input part 127 (Step S107). The image recognition part 120 performs the distance recognition, the recognition of the move object, the recognition of gesture, the recognition of the posture of the designator, the recognition of the face area of the designator, the recognition of the designating area or the like, and specifies the designation content, the designating area, the direction or the position comprehensively from the information (Step S108, image recognizing step).

Next, it is decided whether the designation due to the image is recognized in Step S108 (Step S109). When the designator is too close to the robot R, and the designation cannot be recognized for motion or the like of the hand of the designator overflowing from the imaging range (Step S109, No), for example, the main control part 110 decides that "please separate slightly" and "please designate once again" are uttered. According to the decision, the utterance is uttered from the speaker 45 via the behavior control part 160 and the utterance generation part 162 (Step S110).

Next, when designation is recognized from the image (Step S109, Yes), the specific position decision part 111 decides whether the designation content has been recognized by the voice and coincides (conflict) with the designation content recognized by the image (Step S111). When the designation content does not coincide (Step S111, No), the main control part 110 decides that "please designate once again" and "the designation content of the voice and does not coincide with that of the gesture" are uttered. According to the decision, the utterance is uttered from the speaker 45 via the behavior control part 160 and the utterance generation part 162 (Step S112). When the designation content coincides (Step S111, Yes), the response processing to the designation recognized in FIG. 10 is performed. To perform the voice recognition processing and the image recognition processing simultaneously may be decided, and the image recognition processing may be performed first.

The main control part 110 (behavior decision part 113) decides to judge whether the content of the designation recognized is the movement designation or the movement is the necessary designation (Step S201). When the designation recognized is not the movement designation (Step S201, No), the main control part 110 decides the behavior corresponding to the designation. The designation of the behavior is sent out to the behavior control part 160, the movement control part 161, and the utterance control part 162 or the like, and the robot R operates (Step S202). For example, when the designator shakes the hand and says "hello", the robot performs the movement or the like shaking the hand toward the designator.

When the designation of the designator is the movement designation (Step S201, Yes), the robot R and the map data around the designation position are acquired with reference to the map data base 150 (Step S203).

Next, by the specific position decision part 111, the logical product of the image recognition designating area and voice recognition designating area is taken, and the designating range is narrowed. The object is further searched if needed (Step S204), and the specific position designated as the movement destination or the specific position which is decided from the specific object in the designating area and which should be moved is decided (Step S205).

Next, the area around the specific position is classified into three areas of "warning area PR", "margin area MG" and "safety area SF" as shown in FIG. 7 and FIG. 8 according to the movement ease decision part 112 (Step S206, obstacle recognizing step, warning area setting step, margin area setting step, safety area setting step).

Next, whether the specific position is "safety area SF" is decided (Step S207, movement ease deciding step). When the specific position is not "safety area SF" (Step S207, No), that is, the specific position is "warning area PR" or "margin area MG", the main control part (behavior decision part 113) decides that the corresponding behavior is performed (Step S208, behavior deciding step). For example, it is decided that "since the movement is difficult, the robot cannot move" or the like is uttered to the designator. According to the decision, it is uttered from the speaker 45 through the behavior control part 160 and the utterance generation part 162.

When the specific position is "safety area SF" (Step S207, Yes), the main control part 110 refers to the formed area data shown in FIG. 7 and FIG. 8, and plans the movement route (Step S209, behavior deciding step) and it is confirmed whether the movement route has a problem or not (Step S210, behavior deciding step). For example, it is confirmed whether there is an obstacle which does not exist on the map in the middle of the movement route, or there is a level difference. As a result of the confirmation, when there is a problem (Steps S210, No), the main control part 110 (behavior decision part 113) decides that the corresponding behavior is performed, and controls the robot R. For example, the movement route is replanned once again, or the designator is inquired after moving to a movable position.

When the movement route is satisfactory (Step S210, Yes), the main control part 110 (behavior decision part 113) sends out the designation to the behavior control part 160 so as to move to the specific position and the movement control part 161. Each part such as the leg part R3 is driven by the movement control part 161, and the robot R moves.

Thus, according to the robot R of the embodiment (control unit 100), when the movement designation to the specific position is given to the robot, the movement ease to the specific position is decided using the map data, and the behavior is decided. Therefore, the robot R does not move as designated, but can act after confirming the safety of the specific position on its own. Therefore, the safety of the robot R is increased. That is, since the move mode is changed according to the characteristics (the safety of the safety area, the margin area and the warning area or the like) of the movement destination, the robot can move certainly.

Since the robot R itself confirms the movement ease with the specific position similarly even when the designator makes a mistake in the designation, the damage of the robot R due to the contact with the obstacle is prevented. Since the confirmation is inquired to a designator, suitable communication with the designator can be attained.

Even when the movement designation is sent out by the reference term, the specific position is precisely recognized by narrowing the specific position designated by the reference term, and collating the specific position designated by a gesture or the like, and the mistaken designation by the designator can be recognized. Unnecessary movement can be prevented, and safety can be secured. Also, suitable communication with the designator can be attained. Even if the designator does not send out a detailed designation, the robot can move easily using an easy reference term.

The suitable correspondence according to the movement ease can be taken by dividing a surrounding area into three steps according to the movement ease. That is, the safety area can be enlarged as much as possible and quick movement can be performed by setting the margin area illustrated in the embodiment, and the warning area can be set to a minimum. Further, the movement to the margin area can also be safely performed by moving carefully and confirming on the way at the time of movement to the margin area.

As described above, although the embodiment of the invention was explained, the present invention is not limited to the above embodiment, and the present invention can be performed by changing the present invention suitably. For example, the robot R does not need to be a human type, and may be an animal type. The robot R may be a type moved by a wheel.

When the control unit 100 designates the behavior to the behavior control part 160, the main control part 110 may have the behavior schedule transmission part (behavior schedule transmission means) which designates so as to utter the schedule in which the robot R will act from now on and is not shown. Thus, the behavior of the robot R is decided by the behavior decision part 113, and it is decided that the behavior schedule is outputted by the behavior schedule transmission part (behavior schedule transmission means), and the behavior (movement or the like) and output (utterance or the like) are designated to the behavior control part 160. The destination to which the robot R will move is projected on a monitor (not shown), or for example, "the robot will move to a point of 5 m of the front and of 3 m of the right" is uttered by the speaker 45 via an utterance generation part 162. At this time, the designator may point at the destination simultaneously.

Therefore, the designator or a third person can confirm whether the robot R will move as designated. When movement that the designator does not mean is planned, the designation is sent out again or the stop of movement is ordered. The output of such a behavior schedule may be performed by inquiry of the designator. The computer provided outside of the robot R has the control unit 100, and some or all of the processing of FIG. 9 and FIG. 10 may be executed by the computer based on the information acquired from the robot R by wireless communications. Each function shown in FIG. 4 may be configured by hardware, and may be configured by software.

INDUSTRIAL APPLICABILITY

As described in detail above, the present invention can provide the robot control device, the robot control method and robot control program which can precisely recognize the designation content of the designator based on the voice and image, and can perform the behavior according to the situation. In particular, the robot of the present invention can take the correspondence according to the movement ease and can attain the improvement in the safety of the robot. The area is set according to the distance from the obstacle, and the robot acts according to the area including the designated specific position. Thereby the suitable correspondence can be performed. Suitable correspondence can be carried out by classifying the circumference of the robot into three areas of the warning area, the margin area and the safety area according to the specific position by which the robot is designated. Since the shape of an artificial material is taken into consideration, the robot can take safer behavior. The robot can take the suitable behavior according to the area in which the robot exists. Whether the designation of the designator is appropriate can be recognized in detail by recognizing the reference term, and the designated specific position can be recognized easily and correctly. The necessity that the designator provides a detailed designation is eliminated, and the burden of the designator becomes light. Since the person around the robot can know the behavior schedule of the robot, it is understood whether the designation is correctly transmitted.

Therefore, according to the various purposes of various fields, it is possible to provide the autonomously movable robot capable of performing the advanced behavior control.

The invention claimed is:

1. A robot control device for controlling a robot having a microphone, an imaging device and a self-position detection device, comprising:

a voice recognition part for recognizing the designation content of a designator based on sounds collected by the microphone;

an image recognition part for recognizing the designation content of the designator based on an image captured by the imaging device;

a self-position estimation part for estimating the current position of the robot based on an output from the self-position detection device;

a map data base for retaining map data registering at least the position of an obstacle, wherein the position of the obstacle is recognized by a group of intersections between a plurality of lines from the current position of the robot and the surface of the obstacle;

a decision part for deciding whether the movement to a specific position is required based on the recognition result of the voice recognition part and image recognition part;

a movement ease decision part for deciding movement ease to the specific position based on the current position of the robot estimated by the self-position estimation part and the position of the obstacle from the map data base responsive to the movement to the specific position being required, wherein the current position of the robot indicates at least one of a warning area, a margin area and a safety area in which the robot exists, and the warning area is set based on the position of a circle where a distance between representative points of the surface of the obstacle is set as a diameter of the circle;

a behavior decision part for deciding the behavior according to the movement ease decided by the movement ease decision part; and a behavior control part for executing the behavior according to the decision of the behavior decision part.

2. The robot control device according to claim 1, wherein the movement ease decision part reads the position of the obstacle surrounding the movement route to the specific position from the map data base, and sets at least two or more areas based on the distance from the obstacle, and the behavior decision part decides the behavior according to an area containing the specific position and an area where the robot exists.

3. The robot control device according to claim 1, wherein the movement ease decision part including:

an obstacle recognition part for recognizing the obstacle surrounding the movement route to the specific position from the current position of the robot estimated by the self-position estimation part and the map data;

a warning area set part for setting an area having a possibility to interfere with an obstacle as a warning area when the robot exists, based on the position of the obstacle recognized by the obstacle recognition part;

a margin area set part for setting an area with a predetermined distance from the warning area as a margin area, wherein the predetermined distance is set by a plurality of characteristics associated with the robot; and a safety area set part for setting an area distant from the margin area as a safety area, and wherein the movement ease to the specific position is decided based on the area including the specific position and the area where the robot exists, respectively, applicable to either one of the warning area, the margin area and the safety area.

4. The robot control device according to claim 3, wherein the plurality of characteristics associated with the robot includes one of a group of size, shape, function, movement speed and braking distance of the robot.

5. The robot control device according to claim 1, wherein the behavior decided is one of a group of movement, movement refusal, reconfirmation of designation, stop movement, movement with caution, deceleration and acceleration.

6. The robot control device according to claim 1, wherein the voice recognition part has a designating range specification part for narrowing a designating area using a reference term, and the behavior decision part recognizes a specific position from the area of the logical product of the designating area narrowed by the designating range specification part and designating area recognized by the image recognition part.

7. The robot control device according to claim 1, further comprising a behavior schedule transmission part for outputting a behavior schedule.

8. A robot control method for controlling a robot having a microphone, an imaging device and a self-position detection device, comprising the steps of:

recognizing the designation content of a designator based on sounds collected by the microphone;

recognizing the designation content of the designator based on an image captured by the imaging device;

estimating the current position of the robot based on an output from the self-position detection device;

retaining map data registering at least the position of an obstacle from a map data base, wherein the position of the obstacle is recognized by a group of intersections between a plurality of lines from the current position of the robot and the surface of the obstacle;

deciding whether the designation of the movement to a specific position is required based on the designation content recognized by the sounds and the designation content recognized from the image;

deciding the movement ease to the specific position based on the current position of the robot estimated based on the output from the self-position detection device and the position of the obstacle from the map data base responsive to the movement to the specific position being required, wherein the current position of the robot indicates at least one of a warning area, a margin area and a safety area in which the robot exists, and the warning area is set based on the position of a circle where a distance between representative points of the surface of the obstacle is set as a diameter of the circle;

deciding the behavior according to the decided movement ease; and executing the behavior according to the decided behavior.

9. The robot control method according to claim 8, wherein deciding the movement ease comprises reading the position of the obstacle surrounding the movement route to the specific position from the map data base, and setting at least two or more areas based on the distance from the obstacle, and wherein deciding the behavior comprises deciding the behavior according an area that includes the specific position and an area where the robot exists.

10. The robot control method according to claim 8, wherein deciding the movement ease comprising:

recognizing the obstacle surrounding the movement route to the specific position from the current position of the robot estimated based on the self-position detection device and the map data;

setting a warning area having a possibility to interfere with an obstacle when the robot exists based on the position of the obstacle;

setting a margin area with a predetermined distance from the warning area, wherein the predetermined distance is set by a plurality of characteristics associated with the robot;

setting a safety area distant from the margin area from the obstacle as a safety area; and wherein the movement ease to the specific position is decided based on the area including the specific position and the area where the robot exists, respectively applicable to either one of the warning area, the margin area and the safety area.

11. The robot control method according to claim 8, wherein the behavior decided is one of a group of movement, movement refusal, reconfirmation of designation, stop movement, movement with caution, deceleration and acceleration.

12. The robot control method according to claim 8, wherein recognizing the content of a designator based on sounds comprises narrowing a designating area using a reference term contained in the sound, wherein recognizing the designation content of the designator based on the image comprises narrowing the designating area from the image, and wherein deciding the behavior comprises recognizing the specific position from the area of the logical product of the designating area narrowed by the sound recognition and image recognition.

13. The robot control method according to claim 8, wherein executing the behavior comprises outputting the behavior schedule.

14. A robot control program stored in a computer readable medium and executed by a computer processor for controlling a robot to perform the steps of:

recognizing the designation content of a designator based on sounds collected by a microphone;

recognizing the designation content of the designator based on the image captured by an imaging device;

retaining map data registering at least the position of an obstacle from a map data base, wherein the position of the obstacle is recognized by a group of intersections between a plurality of lines from the current position of the robot and the surface of the obstacle;

estimating the current position of the robot based on an output from a self-position detection device, deciding whether the movement to a specific position is required based on the designation content recognized by the sounds and the designation content recognized from the image;

deciding the movement ease to the specific position based on the estimated current position of the robot and the position of the obstacle from the map data based responsive to the movement to the specific position being required, wherein the current position of the robot indicates at least one of a warning area, a margin area and the warning area is set based on the position of a circle where a distance between representative points of the surface of the obstacle is set as a diameter of the circle;

deciding the behavior according to the decided movement ease; and executing the behavior according the decided behavior.

* * * * *